Jan. 15, 1957  G. A. LITCHFIELD, JR  2,777,474
AUTOMATIC WEFT REPLENISHING LOOM
Filed March 2, 1954  14 Sheets-Sheet 4
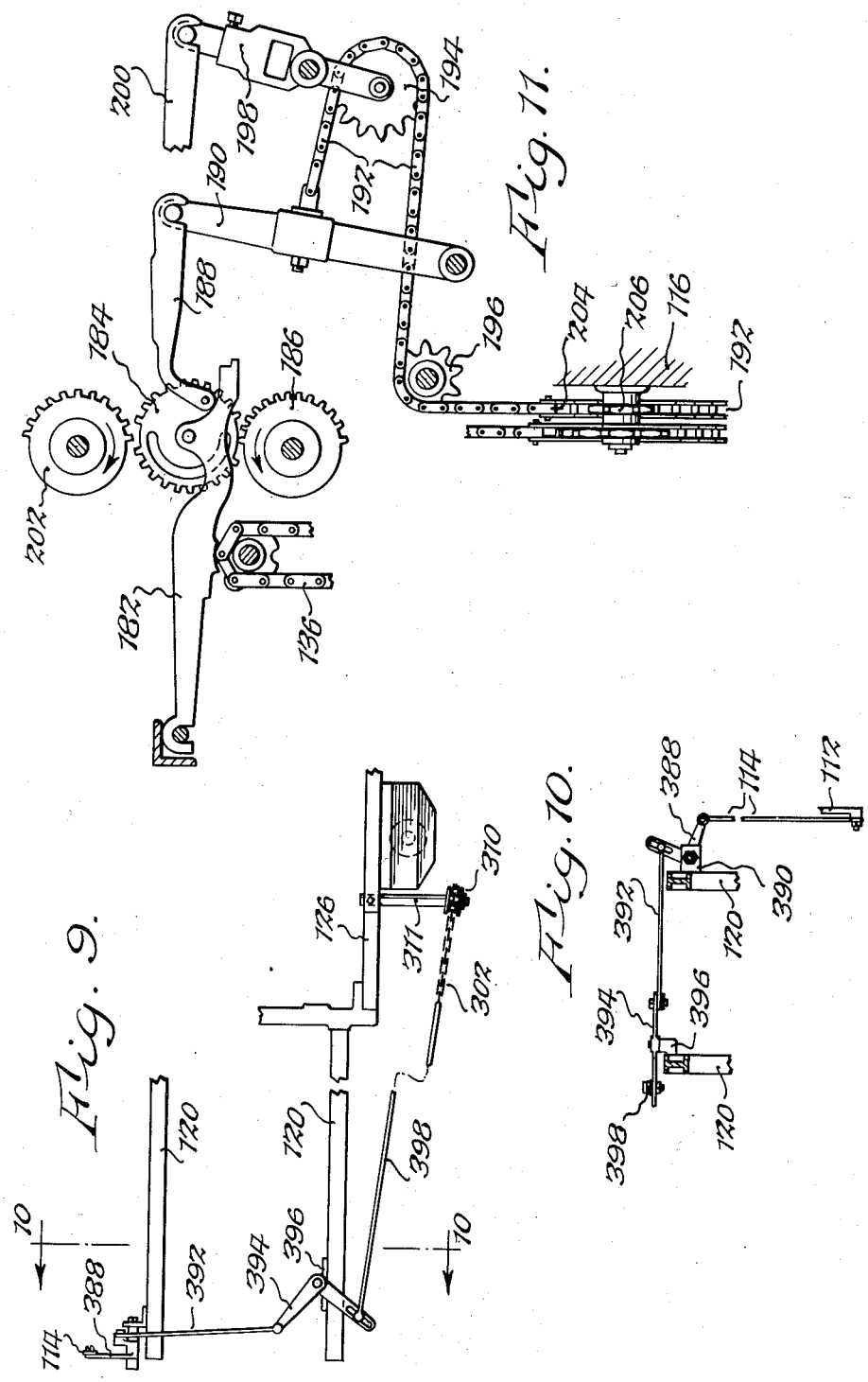

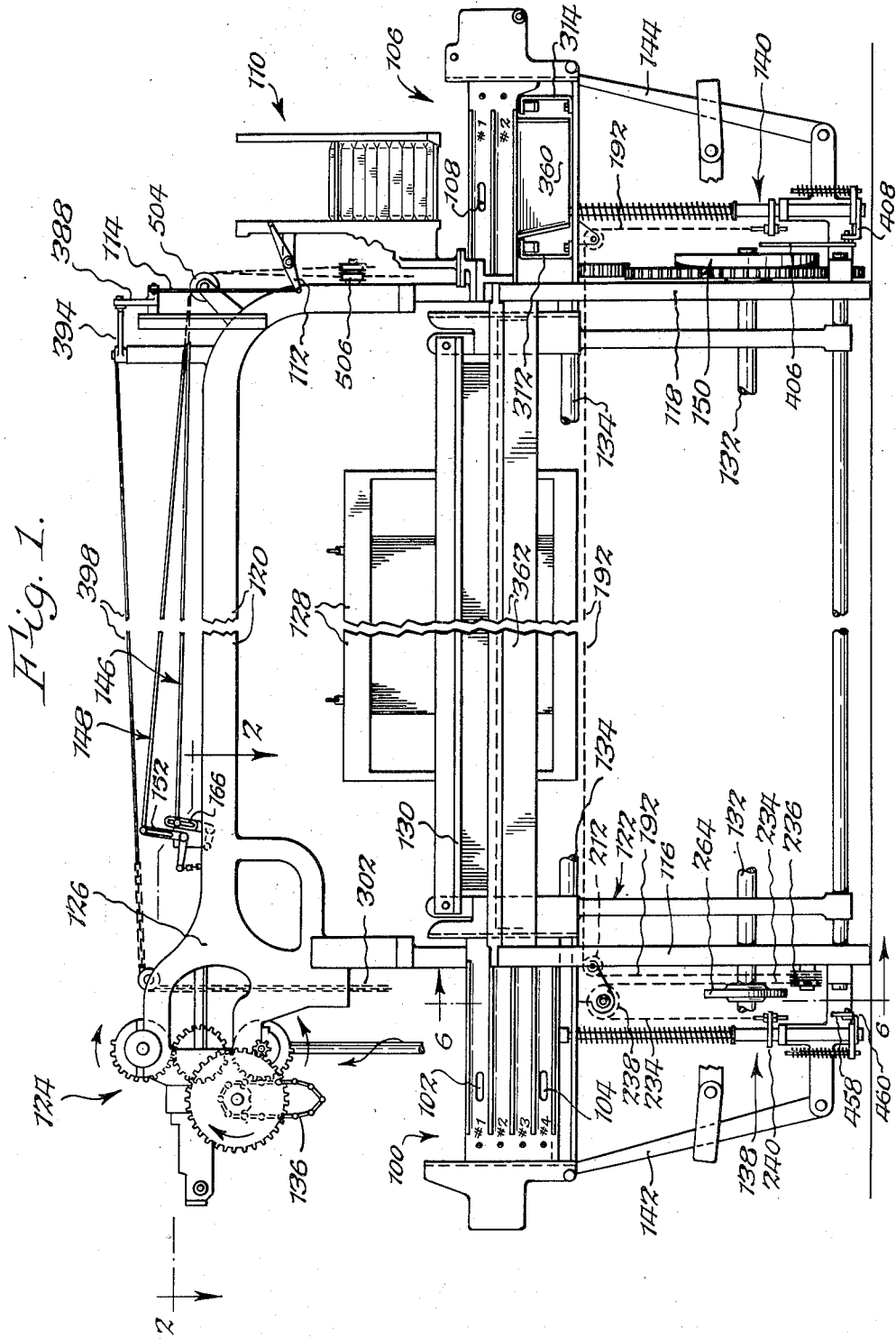

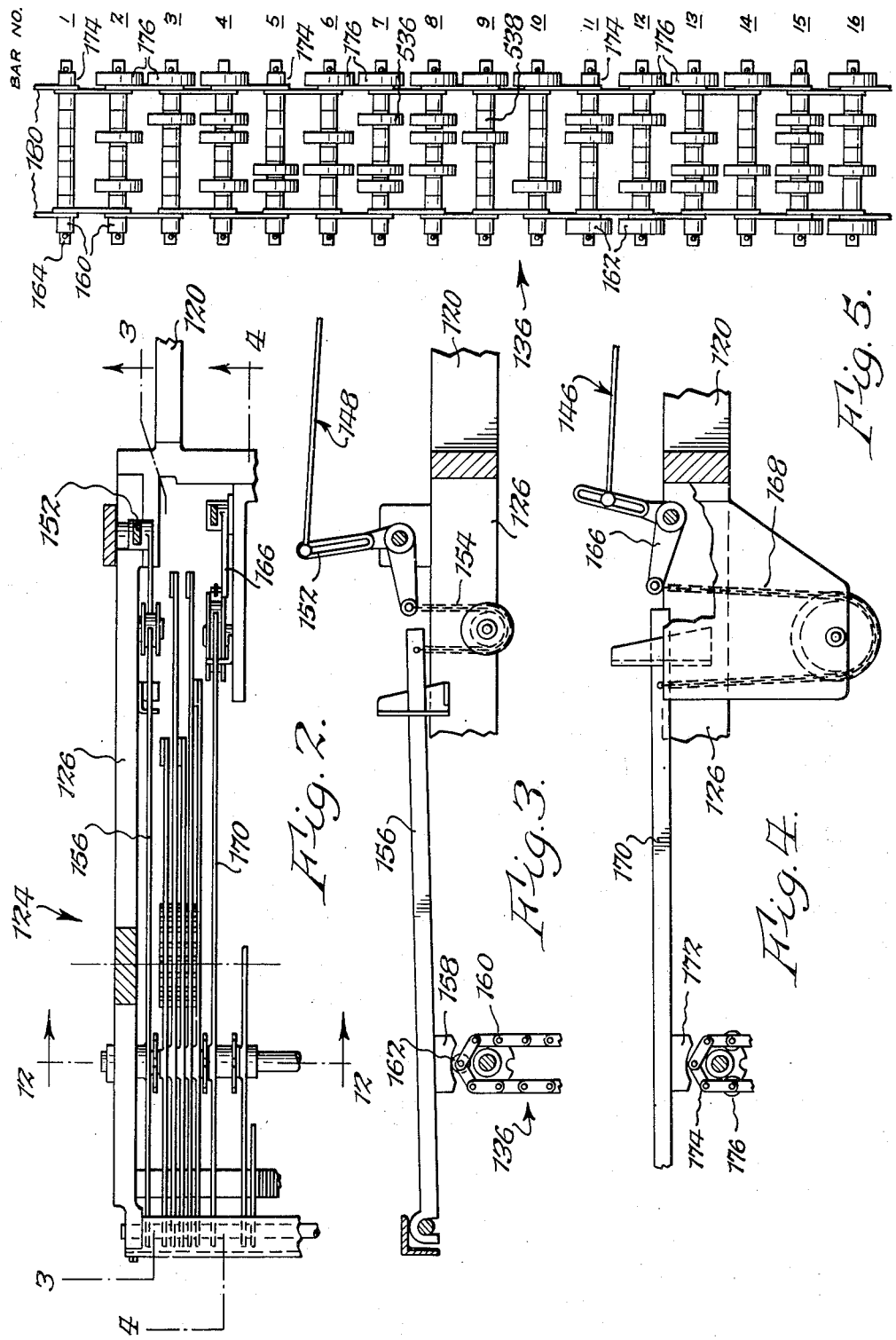

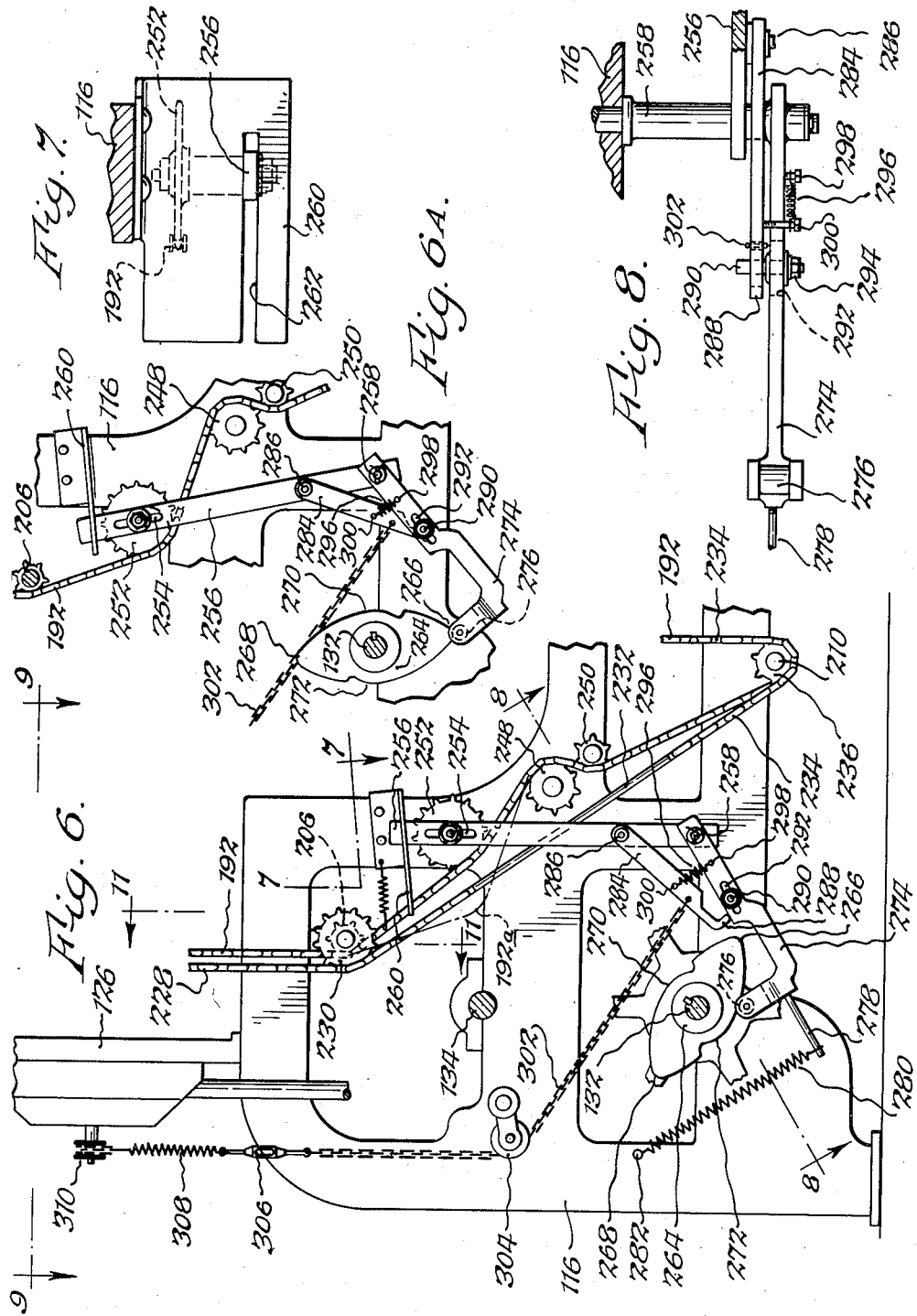

Jan. 15, 1957
G. A. LITCHFIELD, JR
2,777,474
AUTOMATIC WEFT REPLENISHING LOOM
Filed March 2, 1954
14 Sheets-Sheet 5
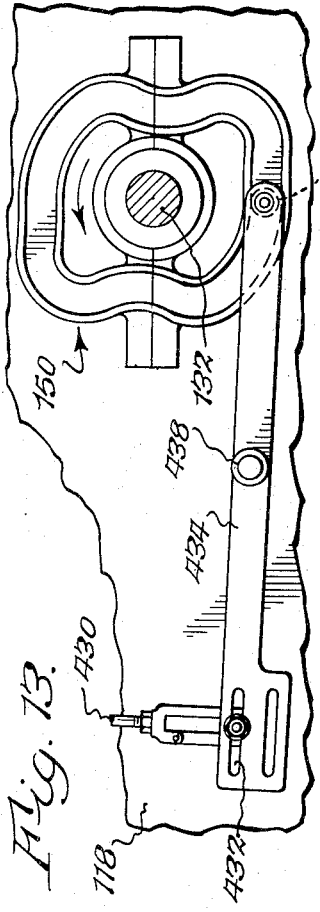
Fig. 13.
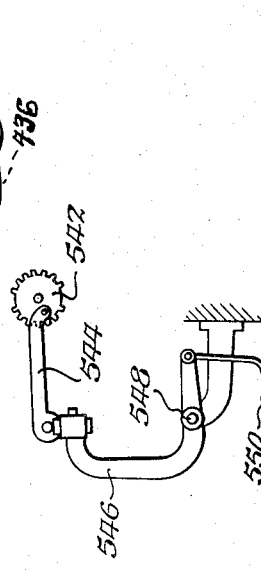
Fig. 14.
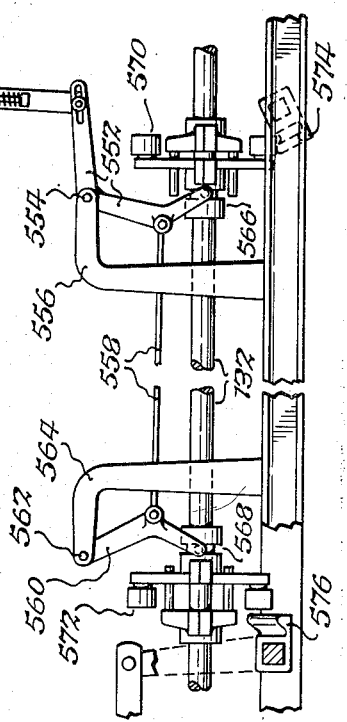
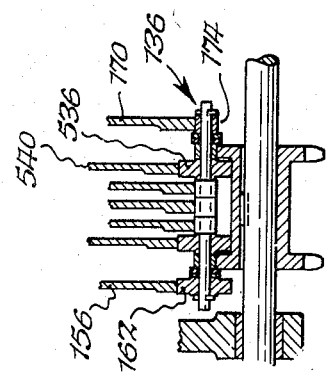
Fig. 12.

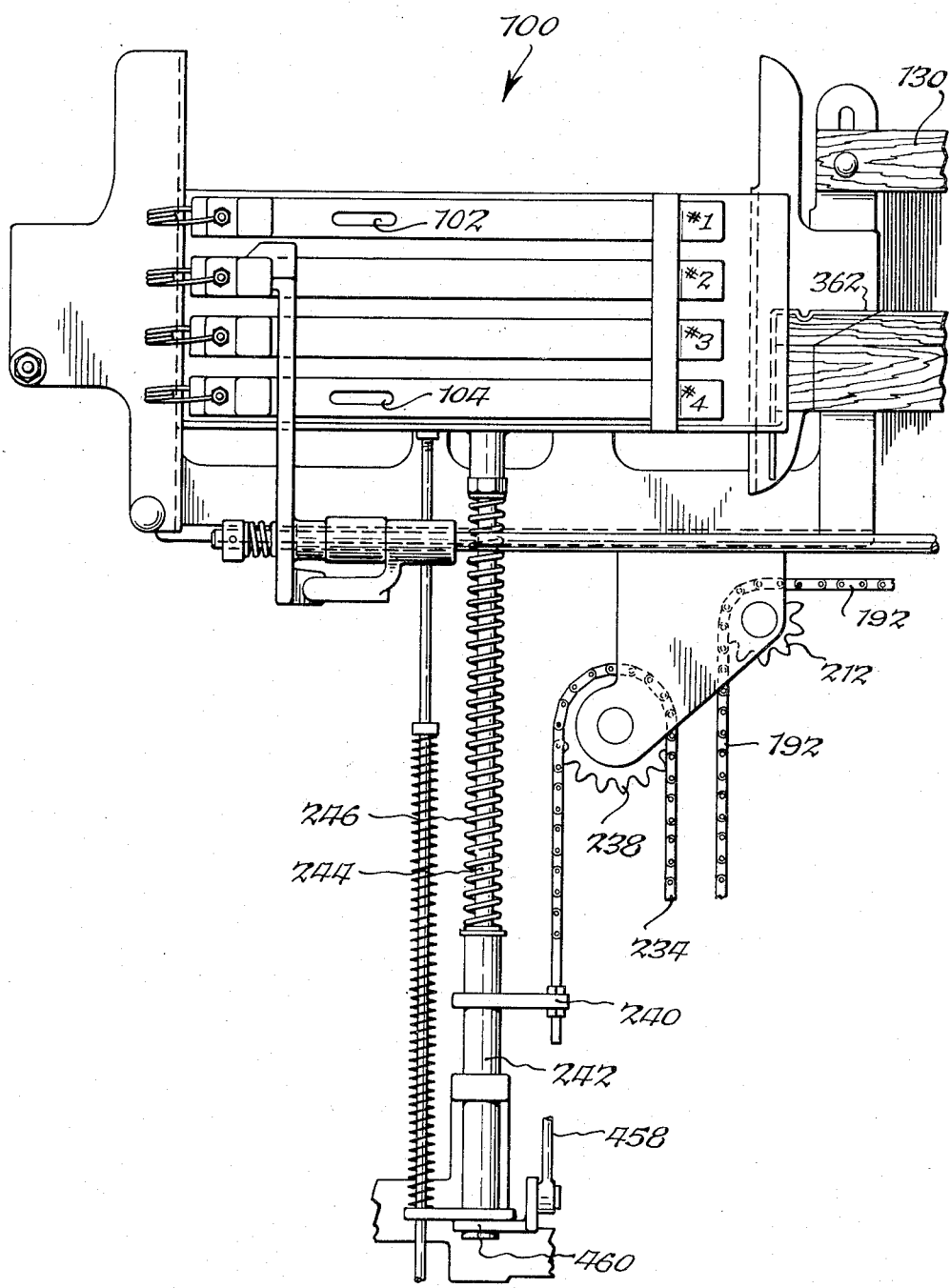

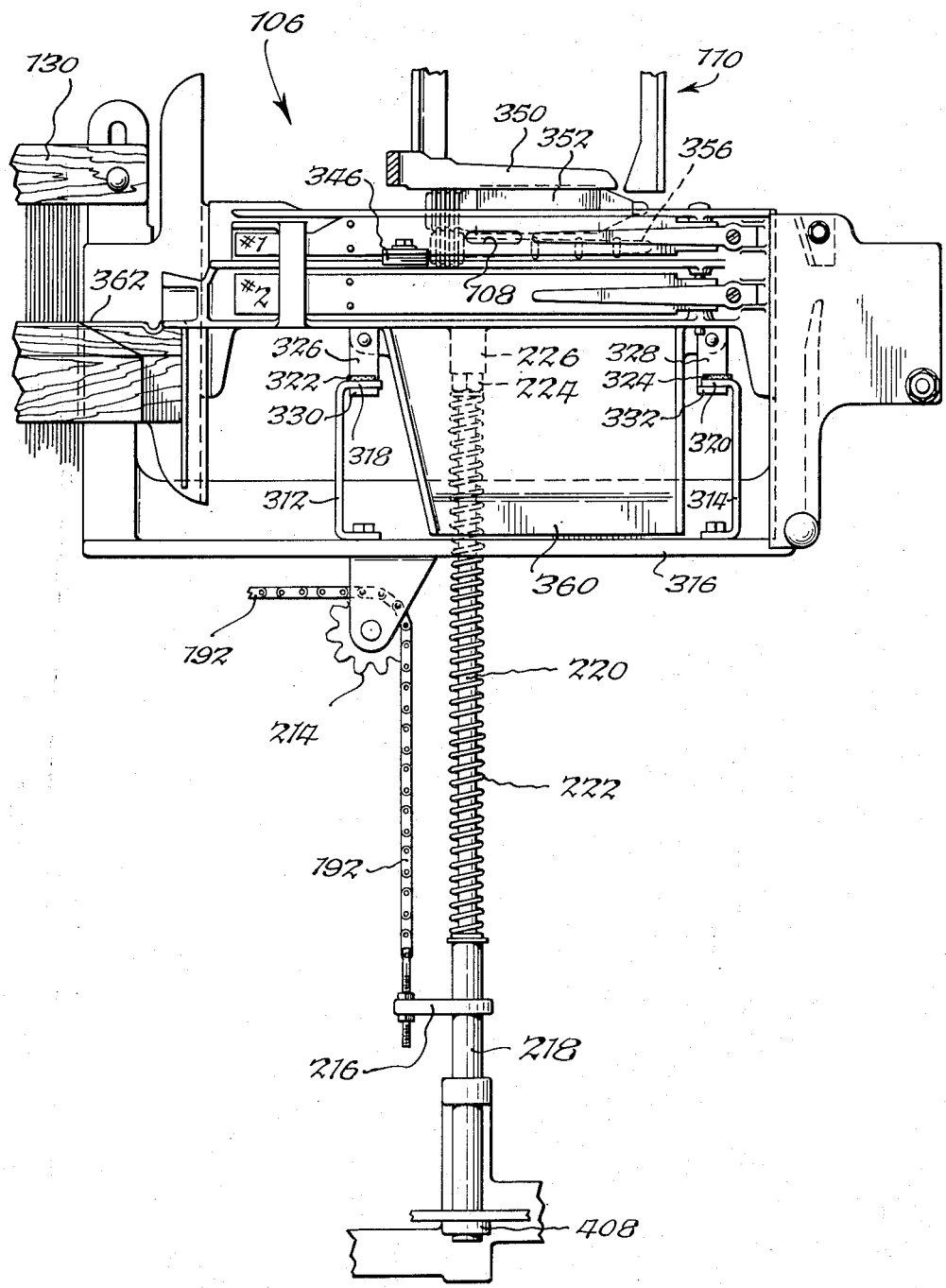

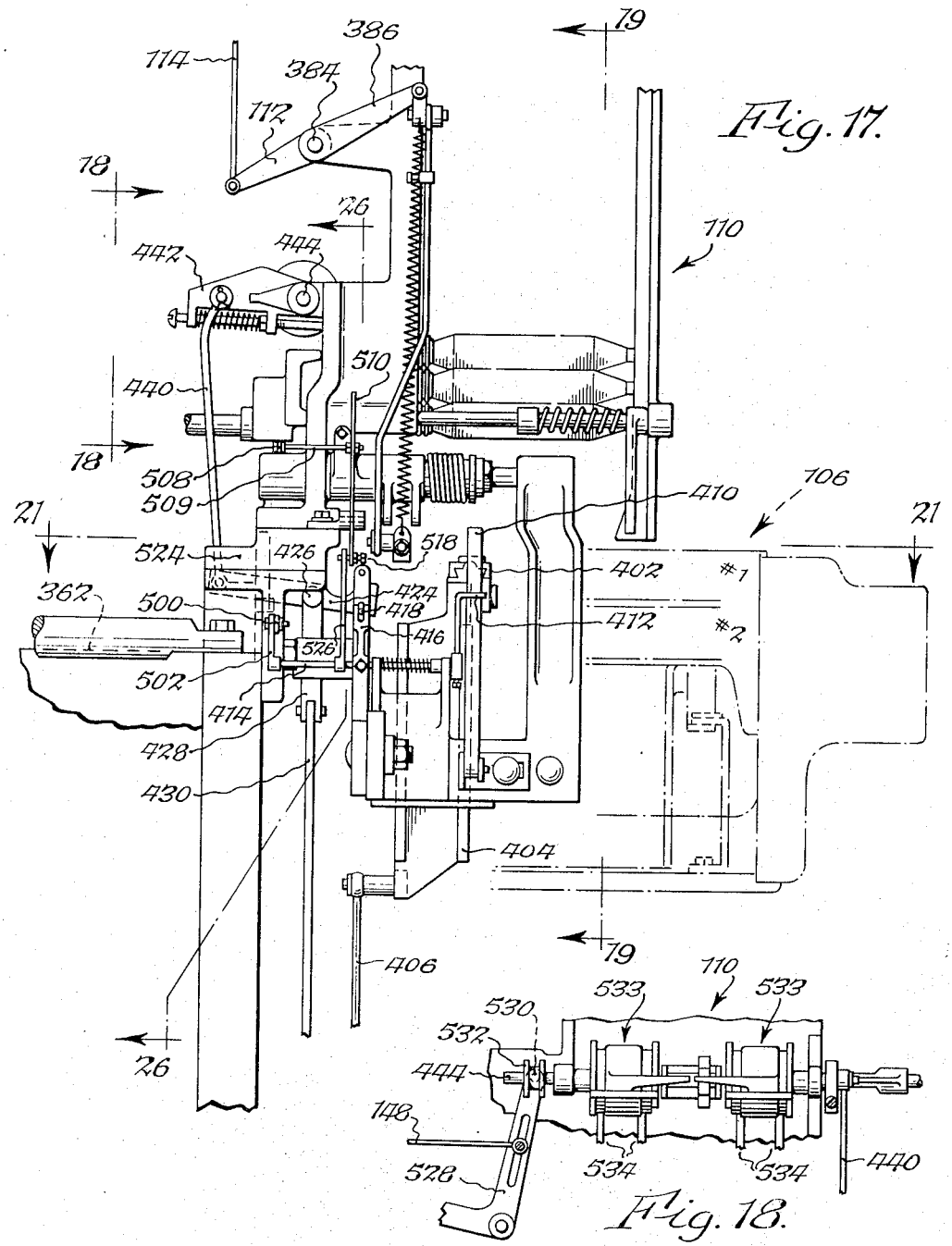

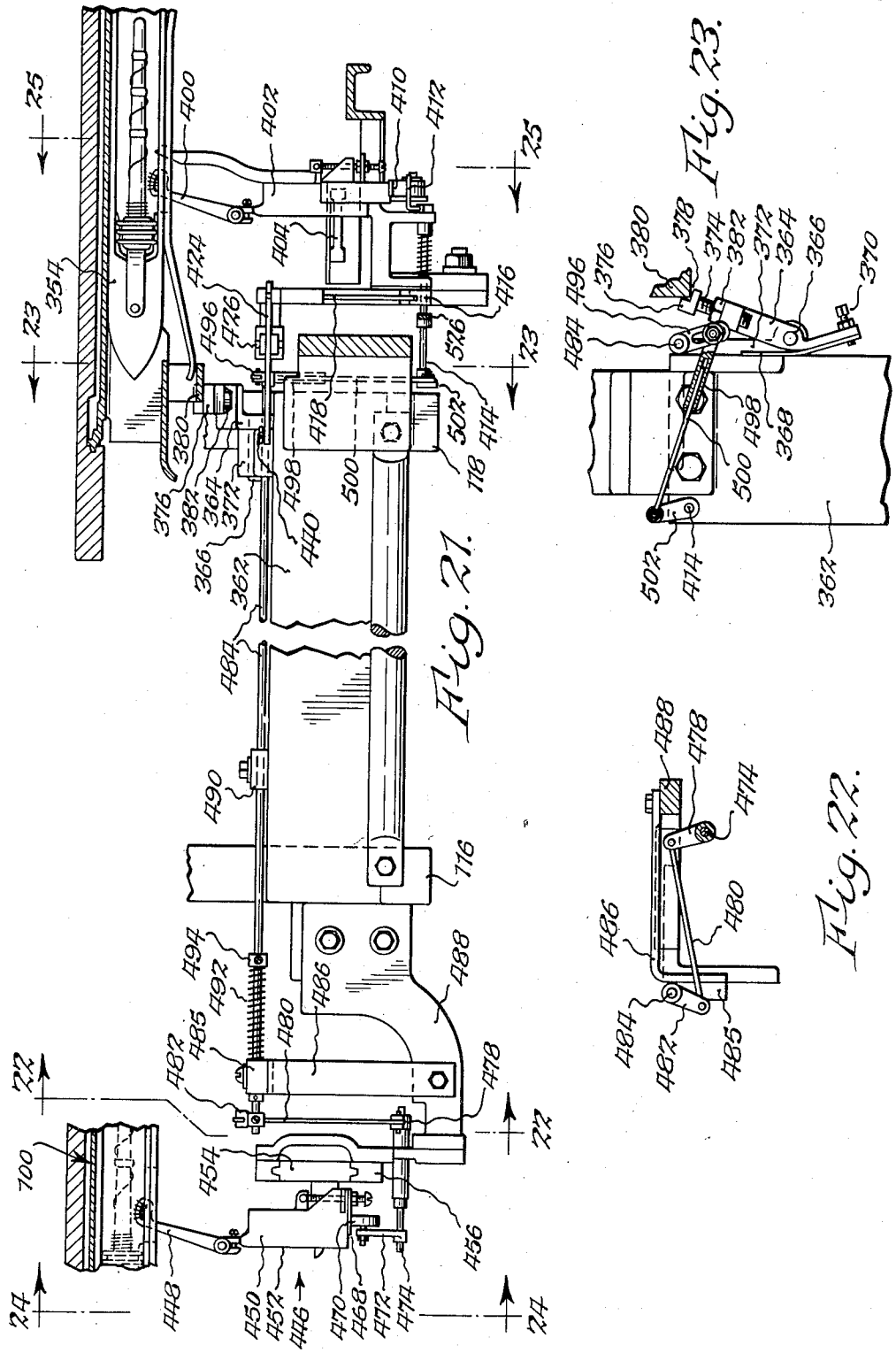

Jan. 15, 1957   G. A. LITCHFIELD, JR   2,777,474
AUTOMATIC WEFT REPLENISHING LOOM
Filed March 2, 1954   14 Sheets-Sheet 11
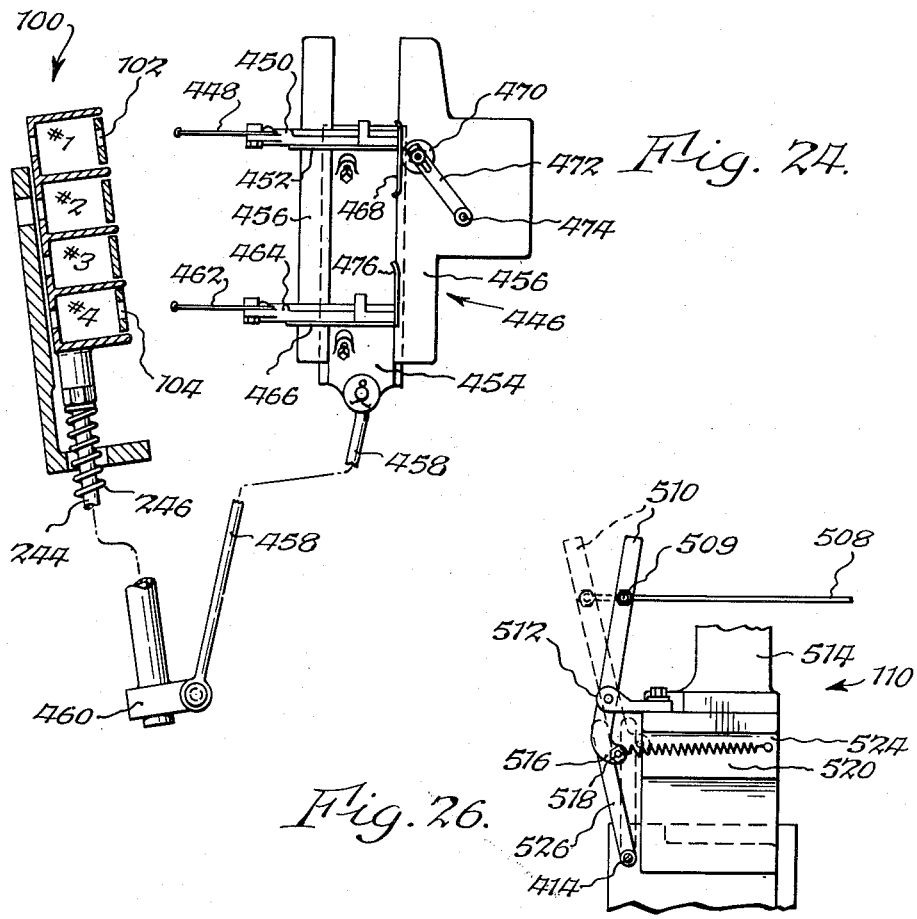
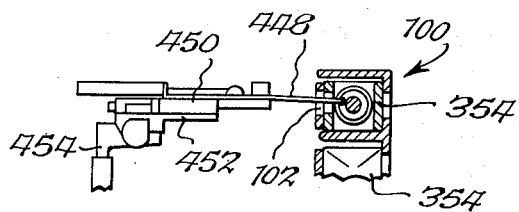
Fig. 25.

Jan. 15, 1957  G. A. LITCHFIELD, JR  2,777,474
AUTOMATIC WEFT REPLENISHING LOOM
Filed March 2, 1954  14 Sheets-Sheet 12
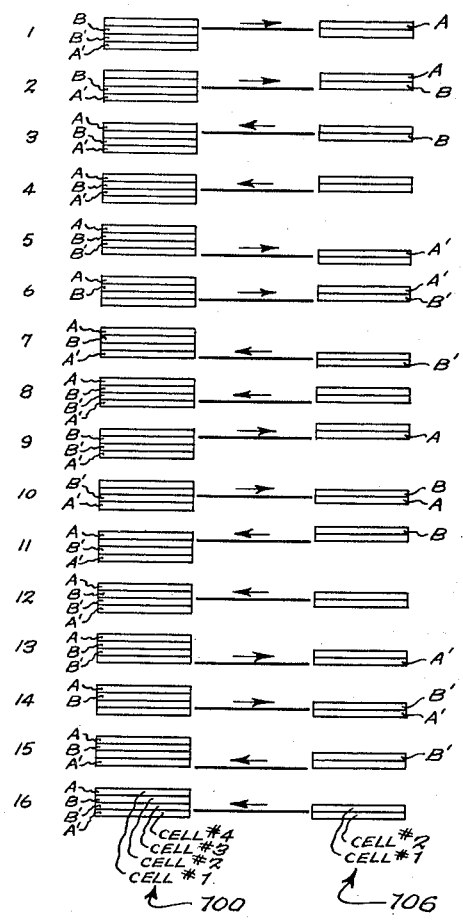
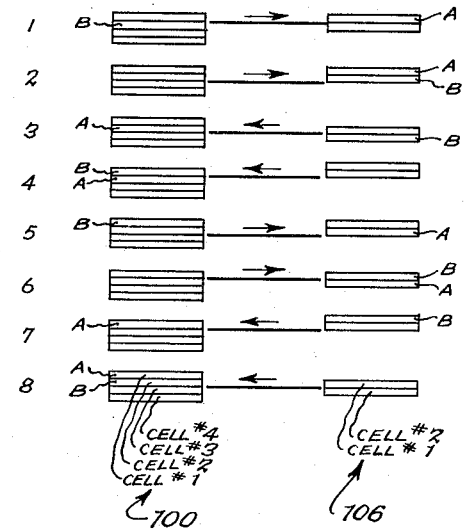
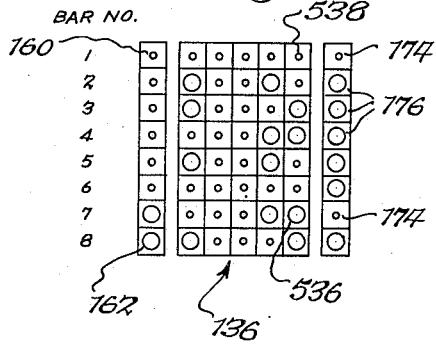
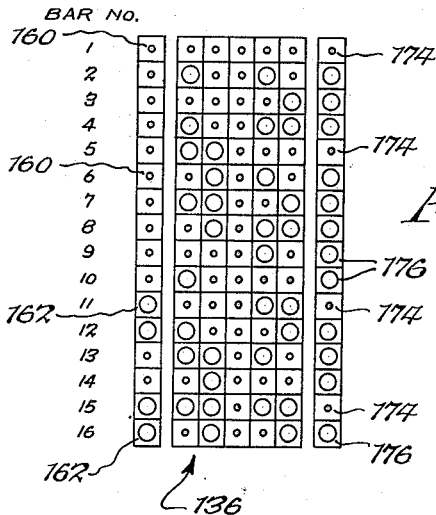

Jan. 15, 1957  G. A. LITCHFIELD, JR  2,777,474
AUTOMATIC WEFT REPLENISHING LOOM
Filed March 2, 1954  14 Sheets-Sheet 13
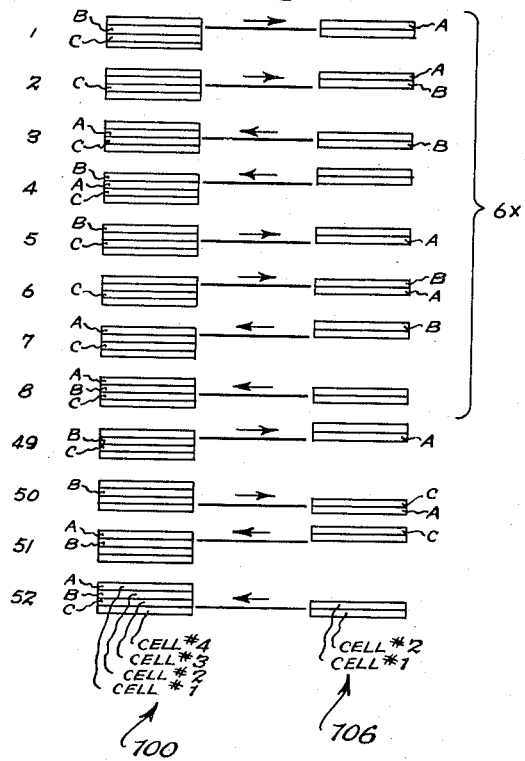
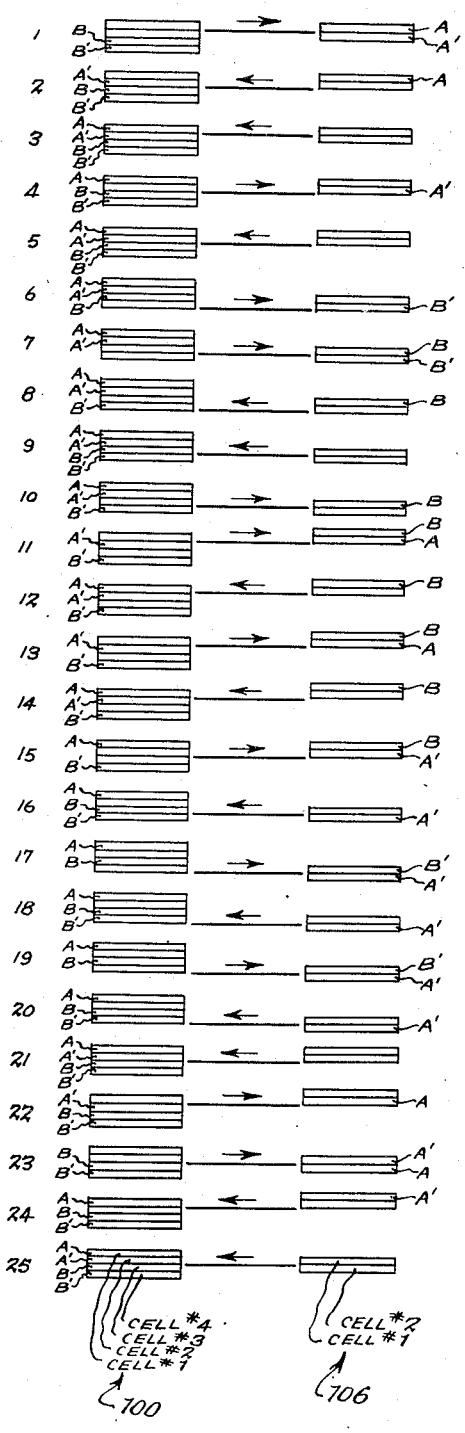
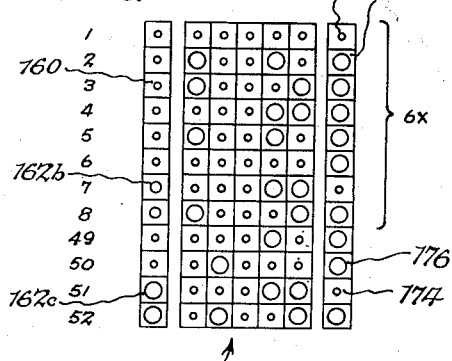

Jan. 15, 1957　　　G. A. LITCHFIELD, JR　　　2,777,474
AUTOMATIC WEFT REPLENISHING LOOM
Filed March 2, 1954　　　　　　　　　　　　　14 Sheets-Sheet 14
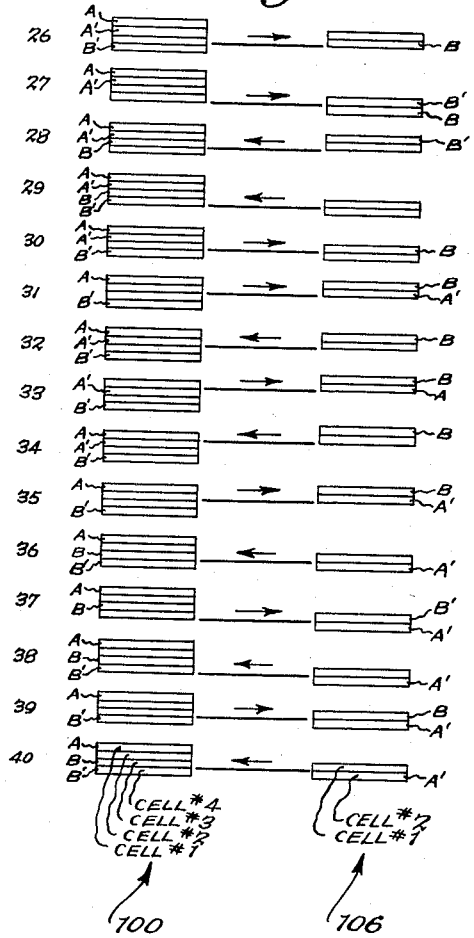
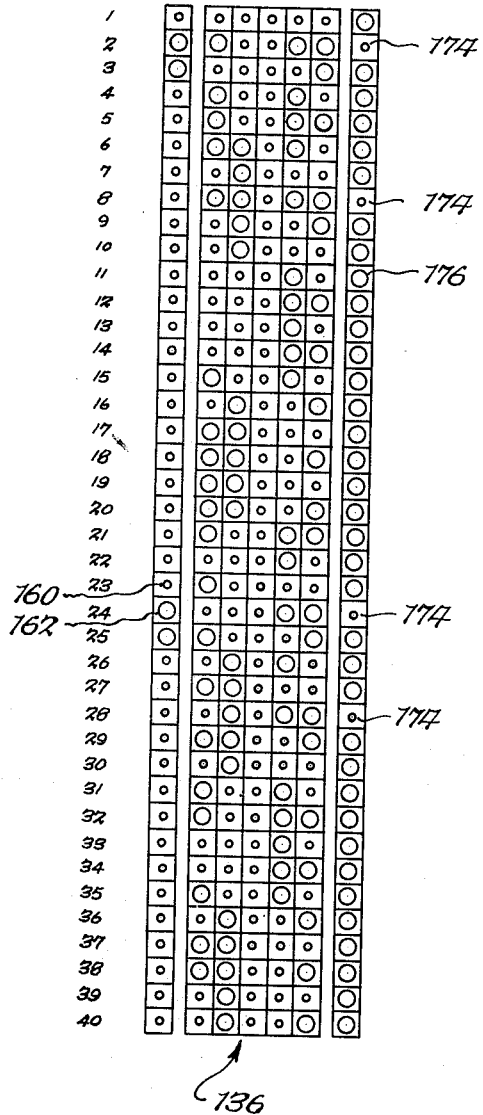

United States Patent Office 2,777,474
Patented Jan. 15, 1957

2,777,474

AUTOMATIC WEFT REPLENISHING LOOM

George A. Litchfield, Jr., South Duxbury, Mass., assignor to Forstmann Woolen Co., Passaic, N. J., a corporation of New Jersey Application March 2, 1954, Serial No. 413,544

9 Claims. (Cl. 139—232)

The present invention relates to looms and more particularly to certain structural changes and additions to a well-known and widely employed type of loom for weaving textile materials whereby such loom may be operated at full production capacity with automatic weft replenishment while continuously weaving patterns of widely varying types including those requiring alternating pick and pick weaving with two, three or four shuttles. The capability of the loom for handling these particular patterns in no wise detracts from its ability to weave other kinds of pick and pick patterns with three or more shuttles. Furthermore, the loom is not adversely affected insofar as the weaving of other types of patterns is concerned even including straight automatic weaving.

The principles of the present invention may be embodied in appropriate structure for use in many different types of looms. For the purposes of illustration the present invention has been shown embodied in a Crompton & Knowles Type W-3 loom with a 4 x 2 shuttle box arrangement substantially in accordance with the conversion provided by the manufacturer for automatic weaving. The loom chosen for illustration is provided with the sliding pick motion and magazine customarily furnished by the manufacturer for such conversion of the type W-3 loom and, in addition, is provided with an A. & W. filling feeder attachment of the type shown in U. S. Patent 2,399,457. In accordance with the present invention, the loom thus equipped and provided with the novel structural features herein disclosed, will provide automatic weft replenishment without any loss in production in the weaving of patterns which heretofore have required conversion of the loom to a box arrangement wherein manual replenishment has been necessary.

An important feature of the present invention lies in the provision of mechanism responsive to the detection of a substantially exhausted weft-carrier which will initiate a transfer cycle only when the disposition of shuttles is such as to permit of transfer combined with further mechanism which will assure that the change box at the drive or magazine end of the loom will be elevated to proper transfer position with respect to the magazine in a sufficiently short time after detection for transfer to be effected before the next pick. To this end a supplemental box lifting apparatus is provided whereby upon the initiation of a transfer cycle the change box at the drive end of the loom is elevated at a greater than normal speed in any instance wherein such rapid elevation is necessary.

In addition to the box elevating feature just described, the loom is equipped for detection as an incident to each pick and a detector mechanism is provided at both ends of the loom inasmuch as it is necessary, in some instances, to make use of both such mechanisms. When equipped in accordance with the present invention, the loom has great flexibility and productive capacity and the need for major conversions to adapt the loom for weaving patterns of various types becomes substantially non-existent.

For a better preliminary understanding of the present invention, the operation of a loom will be considered with only two shuttles weaving an alternating pick and pick pattern with a magazine at the drive end of the loom so positioned that transfer is effected in cell #1 with cell #2 at race plate level. Cell #2 must be empty in order that the exhausted weft carrier may be discharged through the floor of cell #1, through the empty cell #2 and away from the loom. In two-shuttle alternating pick and pick weaving this means that transfer can be effected only under two conditions: (1) Immediately after a shuttle is received in cell #1 with cell #2 empty; and (2) immediately after a shuttle has been picked from cell #2 and the other shuttle remains in cell #1. The loom as supplied by the manufacturer and converted for automatic operation is incapable of effecting automatic weft replenishment under these conditions. It has been necessary to employ at least three shuttles and resort to one "blind pick" out of three to achieve alternating pick and pick weaving with automatic weft replenishment. In accordance with the present invention transfer may be effected under both of the conditions outlined above. For the first condition detection occurs at the head end of the loom and if the weft carrier is substantially exhausted, the transfer cycle will be initiated during the time that the shuttle moves from the head end to cell #1 at the drive end of the loom. Lifting of the box at the drive end is effected with great rapidity so that cell #1 is brought into proper registration with the magazine and transfer is completed before the other shuttle leaves the head end of the loom to be received in cell #2, which is now at race plate level at the drive end of the loom. Under the second condition described above, cell #2, at the drive end, is at race plate level and a shuttle has just been picked from that cell. Detection in this instance occurs at the drive end of the loom as the lay moves forward in preparation for the pick just described. Cell #1 is already at transfer level, and for the purposes of the present invention it is maintained at that level long enough for the transfer cycle to be initiated and completed. The drive end shuttle box is then rapidly lowered to bring cell #1 to race plate level for the next pick. In an eight pick cycle each of the conditions described above will occur once thus making it unnecessary to provide unusually great reserve in the weft carriers.

It will be appreciated that in an eight pick cycle such as that just referred to the detectors at one or both ends of the loom will enter a cell on each pick and in some instances will enter an empty cell and in other instances will engage a substantially exhausted weft-carrier in the course of a pick in which initiation of transfer should not occur. As indicated in the above general description, the present invention contemplates the use of mechanism for preventing initiation of transfer whenever such false or untimely detection occurs. A suitable mechanism of this sort is disclosed in my copending application Serial No. 379,687, filed September 11, 1953. Such mechanism is controlled by a pattern chain which is built in such manner as to revoke all positive reactions of the detector mechanism in all picks except those wherein transfer can be effected. As disclosed in said copending application, such revoking mechanism may be interposed between the detector and the indicator mechanism and may respond to risers and sinkers on a pattern chain to permit or to prevent initiation of the transfer cycle as desired.

From the foregoing preliminary description of one example of the operation of the present invention the adaptability thereof to operation in connection with the weaving of substantially any sort of pattern will be readily recognized. It is an object of the present invention to provide a loom having the great flexibility and utility which is implied in the foregoing preliminary description. Other objects and advantages of the present invention will become apparent from a consideration of the following detailed description of a preferred embodiment of the invention taken in connection with the drawings forming a part of this specification.

In the drawings:

Fig. 1 is a simplified somewhat diagrammatic front elevational view of a loom of a standard type to which the present invention has been applied and in which is shown certain of the conventional parts of the loom with which the present invention cooperates;

Fig. 2 is a horizontal section along the line 2—2 in Fig. 1;

Fig. 3 is a vertical section along the line 3—3 in Fig. 2;

Fig. 4 is a vertical section along the line 4—4 in Fig. 2;

Fig. 5 is a plan view of a box pattern chain adapted for operation in accordance with the present invention;

Fig. 6 is a fragmentary vertical section along the line 6—6 in Fig. 1;

Fig. 6A is a view similar to Fig. 6 but showing the parts in a different position;

Fig. 7 is a fragmentary horizontal section along the line 7—7 in Fig. 6;

Fig. 8 is a generally horizontal section along the line 8—8 in Fig. 6;

Fig. 9 is a fragmentary plan view taken from the line 9—9 in Fig. 6;

Fig. 10 is a fragmentary view of mechanism connecting the parts shown in Figs. 9 and 17;

Fig. 11 is a fragmentary vertical section taken along the line 11—11 in Fig. 6 and showing parts in addition to those included in Fig. 6;

Fig. 12 is a fragmentary vertical section taken along the line 12—12 in Fig. 2;

Fig. 13 is a fragmentary end elevational view of a detector actuating cam and lever in which the cam has been modified to provide a detecting cycle in each pick;

Fig. 14 is a fragmentary rear elevational view of the sliding pick motion showing the parts in a position which does not correspond with the position of the pattern chain as shown in Fig. 12;

Fig. 15 is a front elevational view of the shuttle box at the head end of the loom showing a part of the box lifting mechanism therefor;

Fig. 16 is a front elevational view of the shuttle box at the drive end of the loom showing a part of the box lifting mechanism therefor;

Fig. 17 is a front elevational view at the drive or magazine end of the loom showing parts which have been omitted from Fig. 16;

Fig. 18 is a fragmentary elevational view taken along the line 18—18 in Fig. 17;

Fig. 21 is a horizontal section along the line 21—21 in Fig. 17;

Fig. 22 is a fragmentary vertical section taken along the line 22—22 in Fig. 21;

Fig. 23 is a fragmentary vertical section taken along the line 23—23 in Fig. 21;

Fig. 24 is a fragmentary end elevational view with parts in section along the line 24—24 in Fig. 21;

Fig. 25 is a fragmentary vertical section along the line 25—25 in Fig. 21;

Fig. 26 is a fragmentary vertical section taken along the line 26—26 in Fig. 17;

Fig. 27 is a diagrammatic view showing the relative position of the shuttle and shuttle boxes in an eight pick cycle of operation of a loom embodying the present invention and in which two shuttles are used in alternating pick and pick operation and in which two shuttle box cells are used at both ends of the loom;

Fig. 28 is a diagrammatic representation of a box pattern chain arranged for operation as illustrated in Fig. 27;

Fig. 29 is a diagrammatic view showing the relative positions of the shuttles and shuttle boxes in a sixteen pick cycle of operation of a loom embodying the present invention and in which four shuttles are used for two colors, each from two different sources to weave an alternating pick and pick pattern;

Fig. 30 is a diagrammatic illustration of a box pattern chain arranged for operation as illustrated in Fig. 29;

Figures 19, 20:
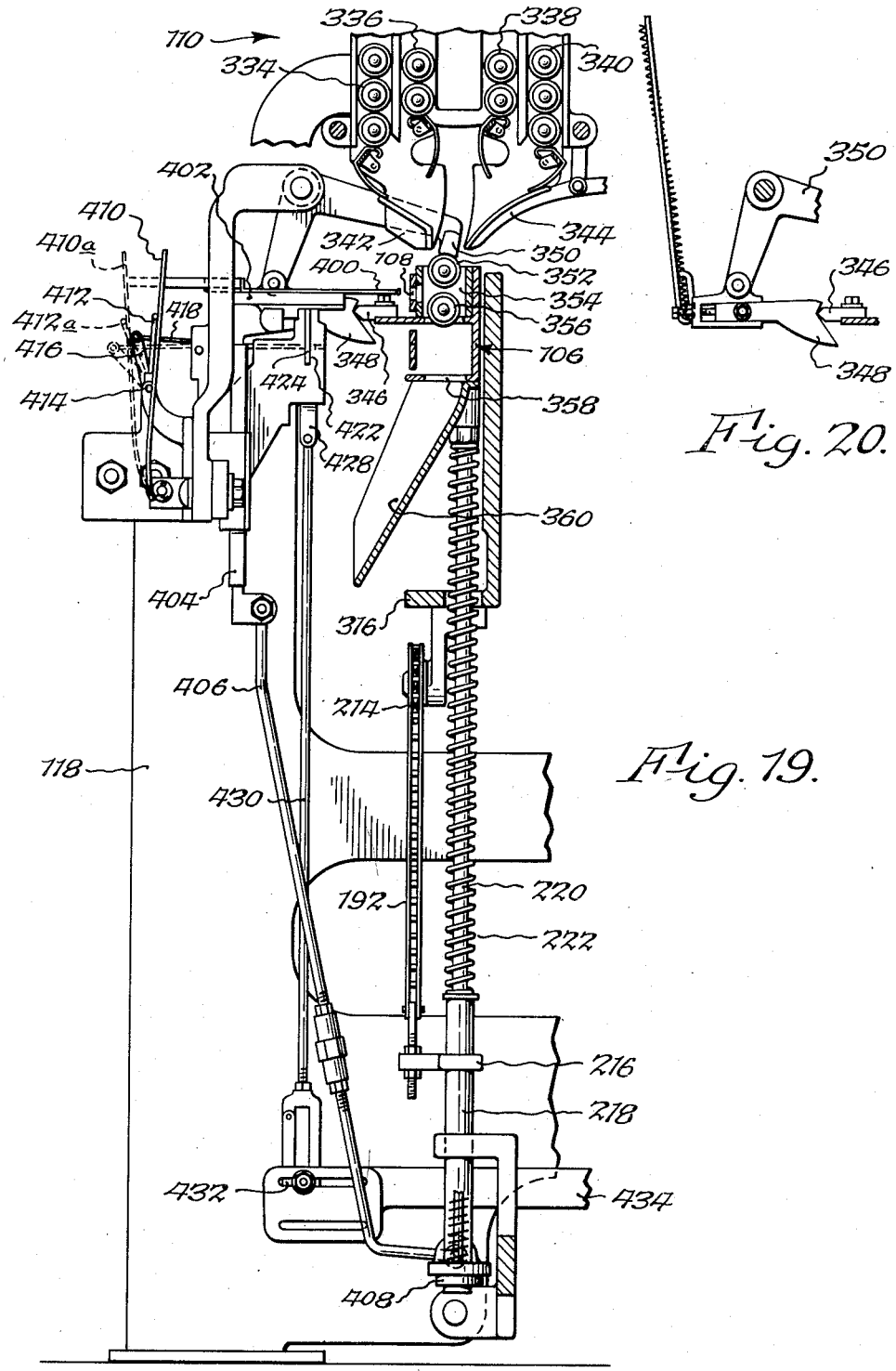
Fig. 19 is a vertical sectional view taken along the line 19—19 in Fig. 17.
Fig. 20 is a detail view of certain parts partially shown in Fig. 19.

Fig. 31 is a diagrammatic view showing the relative positions of the shuttles and shuttle boxes in a fifty-two pick cycle of operation of a loom embodying the present invention including six repeats of an eight pick cycle in which two shuttle are used in alternating pick and pick operation followed by a single four pick cycle in which a third shuttle is used to insert two fillers of a contrasting color separated by a single filler from one of the other two shuttles;

Fig. 32 is a diagrammatic illustrative of a box pattern chain arranged for operation as illustrated in Fig. 31;

Figs. 33 and 34 are diagrammatic views showing the relative positions of the shuttles and shuttle boxes in a forty pick cycle of operation of a loom embodying the present invention in which four shuttles are used for two colors each from two different sources and woven in an alternating sequence of 5 and 5; and Fig. 35 is a diagrammatic representation of a box pattern chain arranged for operation as illustrated in Figs. 33 and 34.

Referring first to Fig. 1, there is shown the major conventional parts of a Crompton & Knowles W-3 convertible loom arranged for 4 x 2 automatic operation insofar as the convertible features of the loom, as furnished by the manufacturer, are concerned. A four-cell shuttle box of substantially the construction ordinarily used with such a loom in such an arrangement may be used at the head end of the loom. However, suitable openings are provided in certain of the shuttle binders to permit entry of a detector feeler so that detection of at least some of the shuttles may occur at the head end in certain operations of the loom as modified for the present invention. The shuttle box at the drive end of the loom is substantially the two-cell shuttle box ordinarily used for this particular conversion of the loom but certain stop and holding mechanism is provided to assure proper vertical positioning of this shuttle box and the maintenance of such position for sufficient time to permit of transfer in spite of the fact that, in accordance with the present invention, certain modifications have been made in the box lifting mechanism and particularly in the speed and timing of the box lifting motion. Auxiliary apparatus is provided and may be controlled by the magazine to affect the drive-end box lifting motion whereby more rapid elevation of the box may be achieved when necessary as a preliminary part of a transfer cycle.

Thus, in Fig. 1, a head-end shuttle box is indicated generally at 100 and is provided with four cells which are numbered from the top down as is usual in this art. Thus, cell #1 is the uppermost cell. Openings 102, and 104 are provided in cells #1 and #4 for permitting entry of detector feelers (not shown in Fig. 1). The drive-end shuttle box is indicated generally at 106. The shuttle box 106 is provided with two cells numbered from the top down and cell #1, or the upper cell, is provided with the usual opening 108 to permit entry of the detector feeler forming a part of detector mechanism (not shown in Fig. 1) at the drive end of the loom.

A magazine generally indicated at 110 is mounted at the drive end of the loom in such position with respect to the shuttle box 106 as to permit transfer of a filled weft carrier to a shuttle positioned in cell #1 when cell #2 is at race plate level. As will be described in greater detail hereinbelow, a lever 112 is fixed to the preventor shaft of the magazine 110 and such lever is connected through linkage generally indicated at 114, which extends across the loom to the head end for the purpose of modifying the drive-end box motion as an incident to initiation of a transfer cycle.

The loom in general comprises the conventional parts including a main frame having legs 116 and 118 and an arch 120. The major operating parts of the loom are assembled upon the frame and include the lay assembly indicated generally at 122 and the head motion assembly indicated generally at 124 which is carried on the head motion frame 126 forming a part of the arch or upper section 120. The loom is provided with the usual harnesses 128 and reed 130. The main shaft 132 and crank shaft 134 are mounted for rotation in the frame for driving the principal components of the loom and for moving the lay in a well-known manner.

The shuttle boxes 100 and 106 are moved to the various vertical positions which they must assume by mechanism including a pattern chain 136 and box lifting mechanism 138 for the head-end box 100 and 140 for the drive-end box 106.

Picker sticks 142 and 144 are provided at the head and drive ends, respectively, of the loom and these may be actuated by any suitable mechanism as, for example, the sliding pick mechanism shown in Fig. 14, and which will be described hereinbelow.

In addition to the special and conventional parts generally referred to above, the loom is equipped with certain mechanism shown in detail in my copending application Serial No. 379,687 aforesaid. These mechanisms include a revoker linkage indicated generally at 146 and a color selector linkage indicated generally at 148. The revoker linkage 146 is provided to prevent operation of the transfer mechanism at any inappropriate time. The color selector linkage 148 is provided for the selection of a weft-carrier from the proper cell of the magazine 110 whenever transfer is to be effected.

Also, as described in detail in my said copending application Serial No. 379,687, the detector cam indicated generally at 150 in Fig. 1 has been redesigned so as to provide a complete cycle of operation of the detector mechanism upon each pick whereas the particular type of loom illustrated herein normally provides one complete cycle of operation of the detector mechanism during the course of two picks. In this connection it should be pointed out that the main shaft 132 which carries the detector cam 150, performs one complete revolution for each two revolutions of the crank shaft 134. For the purposes of the present invention the detector cam 150 is provided with two duplicate contours 180° apart to secure complete cycling of the detector mechanism twice for each revolution of the main shaft 132.

In Figs. 2 through 5 there is shown the mechanism and a characteristic pattern chain for operating the revoker and color selector linkage referred to above and described in full detail in said application Serial No. 379,687. As shown in Fig. 3, the color selector linkage 148 is connected with a bell-crank 152 which in turn is connected by chain 154 with a special lever 156 similar to the conventional vibrators and having a shoe 158 located for cooperation with a row of sinkers 160 and risers 162 carried on the outer ends of the bars 164 of pattern chain 136 (see Fig. 5). As explained in said application No. 379,687, the movement imparted to the color selector linkage 148 by the risers or sinkers or by a series of graduated risers in the event more than two colors or types of yarn are to be selected, appropriately positions the color selecting mechanism to be described hereinbelow in connection with the magazine 110.

The revoker linkage 146 (see Fig. 4) is connected to a bell-crank indicated generally at 166 which is in turn connected by a chain 168 with a special lever 170 having a shoe 172 for cooperation with sinker 174 or risers 176 positioned at the opposite outer ends of the bars 164 of pattern chain 136. The revoker is so arranged that it prevents initiation of a transfer cycle whenever a riser 176 is positioned beneath the shoe 172 of lever 170 and permits initiation of a transfer cycle when a sinker occupies such position. As shown in Fig. 4, a sinker is positioned beneath the shoe 172 and the revoker linkage 146 has moved toward the right as viewed in Fig. 4 into the position therein illustrated. When a riser moves into engagement with the shoe 172 the bell-crank 166 will rock in a counter-clockwise direction drawing the linkage 146 toward the left.

The pattern chain 136 illustrated in Fig. 5 also includes the usual five spaces between the links 180 in which risers and sinkers may be placed in accordance with pattern requirements to control the shuttle boxes and sliding pick motions in the conventional manner. Thus, referring to the uppermost bar 164 shown in Fig. 5, sinkers are located in all seven positions, there being a sinker 160 at the left-hand end for the color selector and the first space inside the overlapping ends of adjacent links 180 being occupied by an element of the same size as a sinker which serves as a sprocket roller. The next four spaces are occupied by sinkers which control box motion vibrators. The next space, going toward the right in said Fig. 5, is occupied by a sinker for controlling the sliding pick motion. The next space is occupied by a sprocket roller and beyond the overlapping adjacent links 180 there is positioned a sinker 174 for controlling the revoker lever 170.

Referring next to Fig. 11, there is shown the conventional vibrator for effecting the lifting of shuttle boxes in a loom of the type herein disclosed. While this mechanism is characteristic of that provided for the boxes at both ends of the loom, the particular vibrator shown in said Fig. 11 is the one which effects a part of the lifting motion for the box at the drive end of the loom. The vibrator lever 182 may occupy the position shown in Fig. 11 which corresponds with the presence of a sinker in appropriate position on chain 136 or a slightly elevated position corresponding with the presence of a riser. In the position shown in Fig. 11, the vibrator gear 184 is engaged with the bottom cylinder 186 and will rotate clockwise to the position shown in said Fig. 11 wherein the connector 188 has been moved to the right swinging a lever 190 clockwise, thus permitting chain 192 to move around the sprockets 194 and 196 and vertically downwardly. A lever 198 is provided to carry the sprocket 194 and said lever 198 is connected through a connector 200 with another vibrator to change the position of the sprocket 194 and thus the ultimate travel of chain 192 in those instances where four different positions are required of the shuttle box. Since the shuttle box 106 has only two cells, only two positions are needed and thus the lever 198 remains inactive. It will be understood that the box lifting mechanism for the four-cell shuttle box 100 at the head end of the loom is similar to that shown in Fig. 11 and that all parts are active since four different positions are required.

The operation just described in connection with Fig. 11 results in a lowering of the shuttle box 106 to position cell #1 thereof at race plate level. When it is desired to raise cell #2 to race plate level a riser is appropriately positioned on the chain 136 to raise the vibrator lever 182. The vibrator gear 184 is thus engaged with the top cylinder 202 which rotates in an opposite direction to the lower cylinder 186 and thus imparts counterclockwise rotation to the vibrator gear 184 to pull the chain 192. The chain 192 is provided with a quarter turn link 204 so that the extension of chain 192 beyond the link 204 may mesh with an idler sprocket 206 carried on the frame of the loom.

Referring now to Fig. 6, the chain 192 passes over the idler sprocket 206 and other sprockets which will be described hereinbelow and finally, around a sprocket (not shown) on idler stud 210 adjacent the bottom of the frame of the loom and from such sprocket upwardly to the point where it is broken away in said Fig. 6. Referring next to Fig. 15, the chain 192 extends upwardly and around an idler sprocket 212 and thence horizontally across the loom where, as shown in Fig. 16, it passes over an idler sprocket 214 and downwardly where it is attached to a bracket 216 on the box lifter tube 218.

As shown in Fig. 16, the box lifter tube is mounted for sliding movement upon a box lifter rod 220 and engages the lower end of a relatively stiff box rod spring 222 which surrounds the rod 220 and at its upper end engages the lock nut 224 on a boss 226 secured to the bottom of the drive end box 106. It will be understood that vertical movement imparted to the box lifter tube 218 will serve to lift the rod 220 and the shuttle box 106 through the box rod spring 222. It should be noted that in Fig. 16 the shuttle box 106 is in elevated position with cell #2 at race plate level and that said figure does not correspond in this respect with Figs. 6 and 11. The box rod spring 222 (Fig. 16) is provided by the manufacturer of the loom for protection in the event of a jam and normally the tube 218, rod 220 and spring 222 move as a unit to lift and lower the box 106. As will become apparent as this description proceeds, the box rod spring 222 is called upon to perform another function in connection with the operation of the loom in accordance with this invention.

As stated above, the box lifting mechanism for the shuttle box 100 at the head end of the loom is similar insofar as conventional parts are concerned to that just described for the shuttle box 106. Thus appropriate vibrators and levers are used to provide four different vertical positions for the box 100. Such positions are achieved by movement of a chain 228 (see Fig. 6) which passes over an idler sprocket 230 and is continued in the form of a chain rod 232 in a space wherein links are not necessary. A further continuation in the form of link chain 234 passes over an idler sprocket 236 on the sprocket stud 210 adjacent the bottom of the loom frame. The chain 234 extends upwardly to the point where it is broken away in Fig. 6. Referring now to Fig. 15, the chain 234 passes over an idler sprocket 238 and downwardly where it is secured to a bracket 240 on the box lifter tube 242 which operates through box rod 244 and spring 246 to position the head-end shuttle box 100 at any one of the four levels to which it must be moved.

As indicated above, a major feature of the present invention lies in the provision of a mechanism which is active upon each transfer cycle to elevate the drive-end shuttle box 106 more rapidly than usual in those instances where such rapid elevation is necessary to place cell #1 of box 106 in transfer relation with the magazone in the very short space of time which is available under certain conditions which occur in alternate pick and pick weaving. In the preliminary example given above, the rapid elevation must be effected when transfer is to be made in a shuttle which has just arrived in cell #1. The normal box lifting apparatus hereinabove described will start to elevate the shuttle box 106 immediately after the shuttle has entered cell #1 and while the lay is moving forward from back center. Expressed otherwise, in a 360° cycle starting at front center, the lay will move backward from zero to 180° (back center) during which time the shuttle will have commenced its flight from the head end of the loom. As the lay moves forward from 180°, the shuttle continues its flight and enters cell #1 at about 240° and the box lifting mechanism will start to raise the box at about 270°. The box lifting cycle will not be completed at front center, or 360°, being only half completed at this time and elevation of the box continues through the first 90° of the next cycle. Thus by the time the shuttle box reaches a position with cell #2 at race plate level, the other shuttle is ready to leave the head end of the loom and there is no time for a transfer to be effected. In accordance with the present invention, the box lifting cycle starts at the same time, i. e., about 270°, but it is completed preferably about 20° ahead of front center. Under these conditions transfer can be effected in the time remaining before the other shuttle enters cell #2 of the box 106.

The auxiliary mechanism for effecting such rapid elevation of the box is put into operation on each transfer cycle. It achieves rapid elevation as described, when necessary and when rapid elevation is not necessary it serves to hold the box 106 at transfer level even though the normal box lifting mechanism starts to move downwardly.

Referring now to Fig. 6, the chain 192 which serves to impart vertical movement to the drive end shuttle box 106 has been described above as extending between idler sprocket 206 and a sprocket positioned behind the sprocket 236 on stub shaft 210 at the bottom of the loom. The portion of the chain 192 extending between these two sprockets is usually interrupted by a chain rod such as the rod 232 introduced between the chain sections 228 and 234 for the head-end shuttle box 100. However, in accordance with the present invention, this portion of the chain 192 is made up of continuous links for cooperation with several sprockets to be described and which serve to impart additional lengthwise movement to the chain 192 when it is desired to modify the normal motion of the drive end shuttle box 106. Thus, as shown in Fig. 6, the chain 192 is conducted over intermediate idlers 248 and 250 freely rotatable on the frame of the loom which serve to establish a length of chain 192 between the idler 206 and the idler 248 which may be displaced for producing additional effective movement of the chain. For this purpose an idler sprocket 252 is arranged to engage this portion of the chain 192 in a position generally midway between the sprockets 206 and 248. The sprocket 252 is adjustably secured in a slot 254 formed in a lever 256 pivoted near its lower end upon a stub shaft 258. At its upper end the lever 256 projects through a slotted plate 260 (see Fig. 7) in which an open ended guide slot 262 is formed and which is of sufficient length to guide and stabilize lever 256 while it swings. It will be recognized that swinging of the lever 256 in a counter-clockwise direction, as viewed in Fig. 6, will displace the chain into a longer path indicated in dot-dash lines at 192a and in full lines in Fig. 6A. Such displacement will impart additional lengthwise movement to the chain 192 when desired.

For swinging the lever 256 counter-clockwise in proper timed relation with the operation of the loom and at the particular times when additional or more rapid box lifting motion is required, the following mechanism has been provided. The main shaft 132 of the loom, which it will be recalled performs one revolution for each two picks, is provided with a double-lobed cam 264 secured by set screws or the equivalent. The lobes of cam 264 provide two identical contours having high points 266 and 268 separated by common low points 270 and 272. The cam 264 rotates in a clockwise direction as viewed in Fig. 6. A follower lever 274 having a roller 276 bearing upon the effective surface of cam 264 is pivoted for swinging movement about the stub shaft 258 upon which the lever 256 is also pivoted (see Fig. 8). At its free end the follower lever 274 carries an extension 278 to which is secured one end of a contractile spring 280 anchored at its opposite end to a pin 282 on the frame of the loom. The spring 280 serves to maintain the follower roller 276 in engagement with the cam 264, constantly during operation of the loom and thus the follower lever 274 swings outwardly and back during each pick. The swinging motion of the follower 274 is imparted to the lever 256 when desired by a pawl 284 pivoted at 286 on the body of the lever 256 and provided with a hook 288 at its free end. As shown most clearly in Fig. 8, the follower 274 carries a stud 290 projecting laterally into the plane in which the pawl swings. Preferably the stud 290 is received in a slot 292 formed in the follower lever 274 and is provided with a lock nut 294 for securing the stud in properly adjusted position relative to the lever 274 and pawl 284. A contractile spring 296 (see Fig. 6) is stretched between cap screws 298 and 300 secured respectively to the pawl 284 and follower lever 274 to constantly urge the pawl 284 toward a position in which the hook 288 thereof will engage the stud 290 on the follower lever 274. The pawl 284 is normally held out of engagement with the stud 290 by a chain 302 which is secured to the pawl 284 and which extends over an idler pulley 304. The chain 302 is provided with a turnbuckle 306 and biveway spring 308 for purposes of adjustment and protection against jams and then extends over an idler pulley 310 to be connected with the magazine 110 as will be described hereinbelow. Upon the initiation of each transfer cycle a moving part of the magazine 110 lets the chain 302 move generally downwardly as viewed in Fig. 6A as urged by the contractile spring 296 whereby the pawl 284 is permitted to swing into engaging relation with the stud on the follower lever 274. The mechanism is so timed that such engagement occurs while the follower roller 276 is in engagement with a low point, for example the low point 272 of the cam 264, whereby the subsequent swinging movement imparted to the follower 274 by the rise of the cam between the point 272 and the high point 266 will pull the pawl 284 to swing lever 256 counter-clockwise, carrying the parts to the position illustrated in Fig. 6A. After the follower roller 276 passes the high point 266 the spring 280 as well as the tension on displaced chain 192 will force the parts to return to the position illustrated in full lines in Fig. 6. It will be understood in this connection that movement imparted by the magazine 110, which initiates the cycle just described, will be completed as an incident to completion of the transfer operation before the follower roller 276 reaches the low point 270. As a result the chain 302 is placed under additional tension, all of which is absorbed in the giveway spring 308. Thus, when the follower roller 276 reaches the low point 270, the tension of the spring 308 is effective to pull the pawl 284 out of engagement with the stud 290 and thereafter the pawl 284 will be maintained in unlatched position until another cycle of the transfer mechanism is initiated.

As will be understood, the apparatus just described imparts a lengthwise movement to the box lifter chain 192 in addition to and in the early part of the normal box lifting movement thereof. In accordance with the present invention, such lengthwise movement is availed of as an additional movement to raise the shuttle box 106 more rapidly when such is required.

During such operation the normal head box lifting motion will continue to attempt to lift the box 106 after it has reached its uppermost position as a result of the additional movement imparted by the mechanism just described. Therefore, it is necessary to provide stop means for preventing the box 106 from rising above the level at which transfer occurs so that the continued effort of the normal head motion will simply be absorbed in the box lifting rod spring 222 (see Fig. 16). The stops just referred to are shown in Fig. 16 wherein the shuttle box 106 is illustrated in its uppermost position and in Fig. 1 wherein the box is lowered. The stops comprise metal brackets 312 and 314 secured to the lay end 316 and having generally horizontally extending portions 318 and 320, respectively, on the upper surfaces of which may be positioned a resilient padding material 322 and 324 which may comprise rubber, leather or other suitable material. The cushions 322 and 324 serve as lower position stops for the box 106 by engaging the lower surface of the floor of cell #2. The brackets 312 and 314 are so positioned as to engage hook-like brackets 326 and 328 secured to the shuttle box 106 and having horizontal extensions 330 and 332 which reach under the extensions 318 and 320 of the fixed brackets 312 and 314 to prevent movement of the shuttle box 106 vertically beyond the position shown in Fig. 16.

Referring now to Fig. 19, the magazine 110 is of conventional construction and includes four cells in which bobbins 334, 336, 338 and 340 are positioned. Upon initiation of a transfer cycle a bobbin will be selected from one of these cells and permitted to drop to the giveways 342 and 344 and the transfer latch mechanism is moved to operative position as is conventional in a magazine of this type. This places the magazine in readiness for delivery of the selected bobbin to the shuttle in cell #1 when the cell reaches proper position relative to the magazine. In Fig. 19 the preliminary operations have been completed. As the lay continues to move forward the bunter 346 engages the transfer latch 348 (see Fig. 20) imparting motion to the hammer 350 to knock the selected bobbin 352 into a shuttle 354 within cell #1. The exhausted bobbin 356 is expelled from the shuttle 354 by the same motion after which it falls through cell #2 and the opening 358 in the floor thereof to a chute 360 which conducts the exhausted bobbin away from the loom.

The action just described places considerable downward force upon the shuttle box 106. The loom, as supplied by the manufacturer, includes a stop mechanism for absorbing downward force and preventing displacement of the shuttle box but such mechanism is operative only in conjunction with the two-pick cycle for which the loom was originally designed. Since, according to the present invention, transfer is on a one-pick cycle basis, a special supporting device which, for convenience, is called a "steadier" may be provided. A generally similar steadier is disclosed in my copending application Serial No. 379,687. In the present instance the steadier is so positioned on the breast beam of the loom as to engage and support the shuttle box 106 through a considerable portion of the transfer cycle. The steadier serves to absorb the shock of transfer and to hold the box in proper level with the magazine even though in some instances the normal box shifting mechanism of the head motion may have started its downward motion before transfer is complete.

The steadier mechanism just referred to is shown in Figs. 21 and 23. Referring first to Fig. 23 in which a portion of the breast beam 362 is shown, the steadier includes a lever 364 pivoted on a stud 366 and urged by a spring 368 to swing clockwise to the extent permitted by abutment of an adjustable stop screw 370 with the vertical face of the breast beam 362. The stud 366 is carried on a bracket 372 secured to the breast beam. The lever 364 is threaded to receive a threaded cylindrical body 374 on the upper end of which is formed a rectangular head 376 (see Fig. 21) provided with a notch 378 to receive the lower corner of binder housing 380 of cell #2 of shuttle box 106. The threaded body 374 is provided for adjustment of the vertical position of the rectangular head 376 and it may be locked in adjusted position by a lock nut 382. As shown in Fig. 23, the lay is still moving forward and the binder housing 380 has been brought to rest in the notch 378 of the steadier head 376. Continued forward motion of the lay will swing the steadier about the pivot 366 in a counter-clockwise direction until the lay reaches front center. As the lay swings backwardly the steadier will remain in engagement with the binder housing until the stop screw 370 strikes the breast beam. As will be explained in greater detail hereinbelow, the steadier is so positioned and adjusted as to engage the box 106 at about 20° ahead of front center and remain in engagement for 20° beyond front center. Thus during 40° of the cycle it is assured that the shuttle box 106 will be held against downward movement irrespective of any motions imparted to the box shifting mechanism by the head motion.

Referring now to Fig. 17, it will be observed that the magazine 110, which is not shown in complete detail, is provided with a preventor shaft 384 to which is fixed the preventor lever 386. The preventor shaft 384 is rocked in a clockwise direction by the preventor lever upon movement of any one of the usual slides in magazine 110 when transfer is initiated. The preventor shaft 384 also has fixed thereto the lever 112 (also see Fig. 1) to which is pivotally secured the rod 114 which is used in accordance with the present invention for setting the mechanism of Fig. 6 into operation. In Fig. 10 the lever 112 and the rod 114 are shown, rod 114 being connected to a bell crank 388 pivoted in a bracket 390 on the arch 120. As shown in Figs. 9 and 10, a rod 392 connects the bell crank 388 with a horizontally disposed bell crank 394 on the rear of the arch 120 being supported thereon by a bracket 396. A rod 398 extends across the back of the loom where it is connected with the chain 302 described above in connection with Fig. 6. The chain 302 extends over the pulley 310 which is mounted on a bracket 311 (see Fig. 9) carried by the head motion frame 126. It will be apparent that clockwise movement of the preventor shaft 384 (Fig. 17) will be transmitted through the linkage just described to permit generally downward movement of the chain 302 as seen in Fig. 6 to set the mechanism in the latter figure into operation upon the initiation of each transfer cycle. Such clockwise movement of the preventor shaft 384 occurs early in the initiation of a transfer cycle and thus puts the mechanism shown in Fig. 6 into operation at a proper time to achieve the rapid elevation of the drive-end shuttle box 106 in any instance where such rapid movement is necessary.

With particular reference to Figs. 19 through 25, the detector and indicator mechanism for initiating a transfer cycle will now be described. The detector mechanism at the drive end of the loom is substantially conventional in construction and has been described in considerable detail in my copending application Serial No. 379,687. For the purposes of the present invention, an additional detector mechanism is provided at the head end of the loom inasmuch as in certain weaving operations made possible by the present invention, detection may occur at the head end of the loom. A transfer cycle initiated by such detection can be completed before the next shuttle is picked from the head-end shuttle box. Referring first to Fig. 19 wherein the major parts of a conventional Crompton & Knowles detecting mechanism are shown, a detector feeler 400 is carried on a horizontal detector feeler slide 402 which is movable horizontally upon a vertical detector slide 404. The detector feeler 400 is positioned to enter the opening 108 in cell #1 of the drive-end shuttle box on every pick of the loom. To this end the detector feeler 400 moves vertically with the shuttle box 106, such movement being afforded by coupling the vertical detector slide with the box lifting mechanism through a connecting rod 406 pivotally connected at its upper end to the vertical detector slide and to the box lifter dog 408 at the lower end of the box lifter 220 (also see Fig. 1 wherein the dog 408 and its connection with the indicating rod is clearly shown). On each forward motion of the lay the detector 400 will enter cell #1 and whenever a filled bobbin is encountered the horizontal feeler slide 402 will be moved to the left as viewed in Fig. 19 and no transfer cycle will be initiated. However, when the feeler 400 enters cell #1 without a shuttle being positioned therein or encounters an exhausted bobbin in cell #1 the horizontal slide 402 will not be moved backwardly. Under these conditions a transfer cycle will be initiated unless revoked by mechanism to be explained hereinbelow.

Whenever the horizontal feeler slide 402 is moved out by engagement with a filled bobbin it swings interconnector arm 410 toward the left into the dotted line position 410a shown in Fig. 19. Such movement of the arm 410 is imparted to indicator finger 412 to move it into the dotted line position 412a in Fig. 19, thus turning the indicator shaft 414 and plunger pin arm 416 into the dotted line position shown in Fig. 19. Such movement pulls plunger 418 out of the plunger housing formed in the detector stand 420 and transfer will not be initiated.

When an exhausted bobbin is encountered the parts will remain in the full line position shown in Fig. 19 wherein plunger 418 remains extended across slot 422 in the detector stand. Plunger 418 then serves as a fulcrum for the chopper lever shown in Fig. 17 at 424. The chopper lever 424 is pivoted at 426 to a rod head 428 on the upper end of detector rod 430 adjustably secured in a slot 432 at the outer end of detector lever 434. The detector lever is rocked on each pick by mechanism shown in Fig. 13 comprising the double-lobed detector cam 150 secured to the main shaft 132 at the drive end of the loom. The detector lever 434 is provided with a follower roller 436 and is pivoted on the frame of the loom at 438.

Referring again to Fig. 17, the chopper lever 424 is pivoted at its left-hand end to the lower end of connecting rod 440 which is attached at its upper end to a lever 442 on the indicator shaft 444 on magazine 110. Vertical reciprocation of the detector rod 430 in response to the detector cam 150 (Fig. 13) is thus effective to swing the lever 442 on the magazine 110 only when the plunger 418 remains beneath the right hand end of the chopper lever 424, in which event the chopper lever 424 fulcrums on plunger 418 and rocks counterclockwise. This initiates the transfer cycle and the mechanism described so far in this connection is conventional.

For the purposes of the present invention a detector mechanism 446 (see Figs. 21-24) which works substantially like that just described is positioned at the head end of the loom and linkage is provided for transmitting detector motion across the loom to effect appropriate movement of the plunger 418 so that a transfer cycle may be initiated by detection at the head end of the loom when so desired. As seen in Fig. 21, this detector mechanism includes a feeler 448 which operates in the same manner as the feeler 400 at the drive end of the loom. The feeler 448 is carried by a horizontal feeler slide 450 slidable upon a bed 452. The bed 452 is carried by a vertical feeler slide 454 movable within a bed 456. The vertical feeler slide 454 is coupled for vertical movement with the head-end shuttle box 100 in much the same manner as the vertical feeler slide at the drive end of the loom. In Fig. 24 a connecting rod 458 is shown pivoted at its upper end to the slide 454 and at its lower end to a lifter dog 460 at the lower end of the box lifter rod 244. The feeler 448 is positioned to enter opening 102 in cell #1 of the head-end shuttle box 100 on every beat of the loom and in each instance wherein it encounters a filled bobbin the horizontal slide 450 will be moved to the right as viewed in Fig. 24.

For use in certain types of weaving which may be accomplished automatically with the present invention, another feeler is positioned to enter the opening 104 in cell #4 of shuttle box 100. The feeler 462 is carried by a horizontal feeler slide 464 which in turn is carried in a bed 466 secured to the vertical feeler slide 454. Both the upper and lower horizontal feeler slides 450 and 464 have secured thereto plates which serve to transmit selected motions of the slides to linkage extending across the loom.

As shown in Fig. 24, a plate 468 secured to the upper slide 450 is in engagement with a roller 470 carried at the free end of lever 472 fixed to a horizontally extending shaft 474. The lever 472 and shaft 474 are mounted in the bed 456 and thus do not partake of a vertical movement of the vertical feeler slide 454. The plate 468 is of sufficient vertical dimensions as to remain in contact with the roller 470 while cell #1 is at race plate level or is approaching race plate level as the lay moves forward. Similarly, the lower horizontal slide 464 is provided with a plate 476 which is of sufficient vertical dimension to remain in contact with the roller 470 while cell #4 is at race plate level or approaching such level during forward motion of the lay. The plates 468 and 476 are spaced vertically from one another so that whenever cell #2 or cell #3 is at race plate level the feelers 448 and 462 will be inactive in the sense that motion thereof cannot be transmitted to the lever 472.

In Fig. 21 the lever 472 and shaft 474 are shown and on the right hand end of shaft 474 there is a lever 478 connected by a rod 480 with a lever 482 fixed to a cross shaft 484 which extends substantially the full width of the loom. The shaft 484 is carried in suitable bearings distributed across the width of the loom. One of these bearings is indicated at 485 and it may comprise a fibre block secured to a bracket 486 in turn attached to the feeler assembly stand 488. Other bearings 490 may be secured at convenient points as desired. A torsion spring 492 surrounds the shaft 484 being secured at one end to a collar 494 and at the other to the bearing 485 to urge the shaft 484 to rotate in a clockwise direction as viewed in Fig. 22 whereby constantly to urge the lever 472 toward the plates 468 and 476 in Fig. 24. It will be apparent that motion of either one of the feeler slides in response to the presence of a filled bobbin will be transmitted so as to produce a counter-clockwise rotation of the shaft 484 as viewed in Fig. 22.

At the opposite end of the shaft 484 (see Fig. 23) there is secured a lever 496 to which is pivoted a plunger housing 498 having a bore to receive a plunger pin 500, the opposite end of which is pivoted to a lever 502 fixed upon the indicator shaft 414. Rocking of the shaft 484 in response to a filled bobbin at the head end will therefore rock the indicator shaft 414 in the same manner as that shaft is rocked by the detection of a filled bobbin at the drive end of the loom, such motion causing the plunger housing 498 (Fig. 23) to move to the left engaging the end of plunger 500 and pushing the latter so as to rock the indicator shaft 414.

The detector mechanisms at the opposite ends of the loom will not interfere with each other. It will be apparent that rocking of the indicator shaft 414 by the detector mechanism at the drive end of the loom will result in sliding of the plunger 500 outwardly of the housing 498. The movement imparted by the detector mechanism at the head end of the loom is transmitted through the housing 498 and 500 to rock the indicator shaft 414 as described above. Such rotation of indicator shaft 414 will swing the indicator finger 412 (see Fig. 19) away from the inter-indicator arm 410 will not effect on the drive end detector. Obviously rocking of the indicator shaft 414 from either end of the loom will serve to withdraw the plunger 418 from the end of the chopper lever 424 to prevent initiation of transfer and if it does not rock as will be the case when an exhausted bobbin is detected, the plunger will remain in position to initiate transfer.

As indicated above, a transfer cycle might also be initiated in any instance wherein both of the active detector fingers might enter an empty cell. This would be a false indication and transfer must be avoided. Also, there may be occasions where one of the feelers engages a substantially exhausted bobbin but the positioning of the shuttles is not such as to permit transfer at that time. A suitable mechanism is provided herein to prevent transfer under either of these conditions or, stated otherwise, to permit transfer only when appropriate. As stated above, the latter mechanism may be substantially the same as that disclosed in my copending application Serial No. 379,687 and thus may comprise apparatus under the control of a pattern chain for withdrawing the plunger 418 on every beat of the loom irrespective of the condition of the detecting mechanism except on those beats of the loom wherein transfer is appropriate. The revoker linkage 146 (Fig. 1) and the manner in which it is controlled by the head motion has already been described. The linkage 146 as shown in Fig. 1 extends over pulleys 504 and 506 and extends from the pulley 506 to be connected with a rod 508 (see Fig. 26), which is pivotally connected to the rod extension 509 extending from the revoker lever 510 pivoted in a bracket 512 on the foot 514 of the magazine 110. The revoker lever 510 has an inwardly extended end 516 in which is secured a horizontally extending pin 518. A spring 520 constantly urges the revoker lever to swing into the dotted line position shown in Fig. 26 wherein the pin 518 moves toward the magazine spacer block 524. A lever 526 is fixed upon the indicator shaft 414 and rocks with the shaft 414 in response to detection as described. The lever 526 is positioned as to be engaged by the pin 518 on the lower end of the revoker lever 510. When the parts are in the full line position shown in Fig. 26, the pin 518 will hold the lever 526 and detector shaft 414 in a position in which the plunger 418 is withdrawn from its housing. Thus so long as the revoker lever 510 occupies the full line position shown in Fig. 26, no transfer cycle can be initiated. This full line position of parts is assumed whenever a riser 176 (see Fig. 5) is positioned beneath the shoe 172 (see Fig. 4) on the special lever 170 thus placing the linkage 146, 508 under tension. When a sinker 174 comes under the shoe 172 the linkage 146, 508 relaxes and the spring 520 (see Fig. 26) will swing the revoker lever 510 counter-clockwise where it will not prevent initiation of transfer if indication occurs.

Selection of a weft-carrier from the proper cell of magazine 110 is also controlled by the pattern chain 136 (see Fig. 5). In the embodiment chosen for illustration the magazine is of the type shown in U. S. Patent 2,360,529 granted October 17, 1944, to R. G. Turner and with it is associated mechanism of the type shown in U. S. Patent 2,399,457 granted April 30, 1946, to E. C. Alix et al. These associated patented structures have been adapted as disclosed in my copending application Serial No. 379,687 for control from the pattern chain through the linkage 148 described above in connection with Figs. 1, 2 and 3.

Referring now to Fig. 18 the color selector linkage 148 is connected with a color selector lever 528 having a pin 530 engaged in an annularly grooved collar 532 secured to the indicator shaft 444 of magazine 110. Rocking of lever 528 in response to the presence of risers 162 or sinkers 160 (see Fig. 5) on the chain 136 will cause lengthwise movement of the indicator shaft 444 and as fully explained in said Alix et al. Patent 2,399,457 this results in selective movement through mechanisms generally indicated at 533, of one of a group of vertical slides operated by levers 534 each of which is connected with a particular cell of the magazine so as to release a bobbin from such cell when desired. Where only two colors are involved the mechanism 533 of Fig. 18 may be availed of to alternately supply each color from two cells. In such event the lever 528 moves between two positions determined by risers and sinkers on chain 136. If more than two colors are used a series of graduated risers may be positioned on chain 136 and the lever 528 may be moved to a corresponding number of different positions in which event the apparatus of Fig. 18 may be adjusted to actuate a different lever 534 for each position of the lever 528.

In order that a great variety of patterns including pick and pick patterns may be woven it is essential that the loom be equipped to pick in any sequence from the shuttle boxes at opposite ends of the loom. The conventional sliding pick motion manufactured by Crompton & Knowles is suitable for this purpose and has been illustrated herein. Fig. 14 is a view from the rear of such apparatus. It is controlled by risers 536 and sinkers 538 on the pattern chain 136 (Fig. 5). The position of the parts in Fig. 14 is that assumed when a sinker 538 is positioned under the vibrator 540 (see Fig. 12) and thus does not correspond with Fig. 12 wherein a riser 536 is so positioned. In the position shown in Fig. 14, the mutilated gear 542 has been moved to its lower position in which it receives counterclockwise rotation thus rocking the vibrator connector 544 and lever 546 about the pivot 548 to raise the linkage 550 which rocks bell crank lever 552 about a pivot 554 mounted on a fixed arm 556. The bell crank lever 552 is connected by a link 558 extending across the loom, with a lever 560 pivoted at 562 to a fixed arm 564. The levers 552 and 560 engage grooved collars 566 and 568, respectively, which shift picking arms 570 and 572, respectively, on hubs carried by the main shaft 132. The picking arms 570 and 572 are adapted to engage picking shoes 574 and 576, respectively, but the arrangement is such that only one arm may engage its corresponding shoe at a time. The position of the parts in Fig. 14 is such that arm 570 will engage shoe 574 and picking will occur at the head end of the loom. To pick from the drive end a riser 536 is brought under the vibrator 540 and the parts in Fig. 14 will shift to bring picking arm 572 into position to engage shoe 576.

The operation of the various mechanisms has been explained in connection with the detailed description hereinabove of each such mechanism. Accordingly, to avoid repetition, the operation of such mechanisms will be only briefly described in connection with their overall interaction in the weaving of certain exemplary patterns which have been chosen as illustrative of the capabilities of the loom provided in accordance with the present invention. The preliminary example set forth at the outset of this specification is illustrated in conventional form in Figs. 27 and 28.

Referring first to Fig. 27, there is shown the various positions of the shuttle boxes and shuttles assumed in an eight pick cycle in which two shuttles are used weaving an alternating pick and pick pattern. While four cells are illustrated in the head end shuttle box, only two cells are used in this particular instance. For purposes of illustration, it will be assumed that cells #1 and #2 only of the head end box 100 will be used. Both cells #1 and #2 of the drive end box 106 will be used. Shuttles are indicated at A and B and the presence of a particular shuttle in a particular cell is indicated by the placing of an appropriate reference character in the cell. The direction of shuttle movement which has brought the shuttles into the illustrated position is indicated by an arrow lying above a solid line indicating race plate level. The shuttles A and B may be assumed to carry different types of yarn, differing perhaps in color, direction of twist, weight or any other well-known characteristic. For the purposes of the present application, reference will be made to difference in color and it is intended that the word "color" shall include all such other differences in yarn as may occur.

From a consideration of Fig. 27, it will be apparent that shuttles A and B were originally positioned in cells #1 and #2 respectively of shuttle box 100 and that on the first pick shuttle A is moved toward the right across the loom to enter cell #1 of the drive end shuttle box 106. For the second pick cells #2 of both shuttle boxes are raised to race plate level and shuttle B is picked from cell #2 of box 100 into cell #2 of box 106. In the succeeding picks shuttles A and B must alternate and as shown in Fig. 27, shuttle A enters cell #2 of the box 100 on the third pick and shuttle B enters cell #1 of the of the box 100 on the fourth pick. It is apparent that the sliding pick motion described above in connection with Fig. 14 is so controlled by the pattern chain 136 as to cause the picking motion at one end of the loom to operate twice in succession followed by two operations of the picking motion at the opposite end of the loom. Referring next to Fig. 28 wherein the pattern chain 136 is diagrammatically illustrated, it will be observed that sinkers 538 and risers 536 are appropriately positioned to operate the sliding pick motion as just described, the sinkers 538 activating the picking motion at the head end and in the risers 536 activating the picking motion at the drive end of the loom. The risers and sinkers for controlling vertical movement of the shuttle box 100 and 106 are illustrated in proper position but will not be described in detail inasmuch as the operation thereof is conventional.

As indicated above in the preliminary example, transfer can occur only in connection with a shuttle which is positioned in cell #1 of the drive end shuttle box 106 when cell #2 thereof is at race plate level and is empty. A further requirement is that the parts reach such position at the proper time in the conventional loom cycle and remain in such position long enough for transfer to be completed. According to the present invention the auxiliary box lifting mechanism illustrated in Fig. 6 and the auxiliary detecting mechanism located at the head end of the loom and illustrated for example in Fig. 21, makes it possible to achieve automatic replenishment on both of the shuttles A and B within an eight pick cycle while achieving full production from the loom. Thus referring to the first pick in Fig. 27, shuttle A has just arrived in cell #1 of box 106. Cell #2 is empty and in preparation for the next pick, cell #1 of box 106 will be elevated to transfer level. However, in the course of the next pick shuttle B will be moved into cell #2 of box 106. Thus if transfer is to be effected in shuttle A, it must be completed within the period of time elapsing from the arrival of shuttle A in cell #1 of box 106 and the arrival of shuttle B in cell #2 of box 106. To achieve this, shuttle A is detected at the head end of the loom before it leaves cell #1 of box 100 in the first pick and in order that such detection may be effective to initiate transfer the revoker mechanism described above is moved by the pattern chain 136 to a position wherein it will not prevent transfer. To this end a sinker 174 is positioned on bar #1 of the pattern chain as illustrated diagrammatically in Fig. 28. Under these conditions the forward movement of the lay in the latter part of the pick preceding the first pick will bring the exhausted bobbin in shuttle A into engagement with the feeler 448 which will slip on the exposed wood of the bobbin and thus will not be effective to move the horizontal feeler slide 450. Also, at this time there is no shuttle in cell #1 of the drive end shuttle box 106. This means that the detector at the drive end of the loom will enter empty cell #1 and would tend to give a false indication. This makes no difference insofar as operation of the present invention is concerned. If there is a full shuttle in the head end box, the detector will be actuated to prevent initiation of a transfer cycle irrespective of the false indication given by the detector at the drive end. When an exhausted bobbin is detected at the head end, transfer will be initiated and the false indication of the drive end detector is of no consequence.

Initiation of the transfer cycle for shuttle A in Fig. 27 occurs upon detection of an exhausted bobbin by the head end detector. Thus, in the first pick shown in Fig. 27, shuttle A has entered cell #1 of box 106 and the lay is moving forward and the normal box lifting mechanism will soon start lifting box 106. However, the transfer cycle has been initiated and the mechanism shown in Fig. 17 will operate the magazine 110 to place an appropriate bobbin in position for transfer. As an incident to this preliminary operation of the magazine 110, the preventor shaft 384 (see Fig. 17) will be rocked clockwise and the linkage 114 extending across the loom (see Figs. 9 and 10) will lower the pawl 284 (see Fig. 6) into engagement with the follower lever 274 whereupon the cam 266 will be effective to swing lever 256 and sprocket 252 into the position shown in Fig. 6A. Such action imparts additional lengthwise movement to the chain 192 which raises drive end shuttle box 106 rapidly to the position in which transfer may be effected, i. e., with cell #2 at race plate level. The timing of the parts is such that the lifting of shuttle box 106 is initiated after shuttle A lands in cell #1 thereof and is completed before the lay reaches front center. The upper position of shuttle box 106 is determined by the stops 312, 314, 326, 328 (see Fig. 16) and the further action of the normal box lifting motion is absorbed in compression of the box lifting rod spring 222. The box 106 comes to rest upon the steadier 376 as shown in Fig. 23 and remains on the steadier for a sufficient time to permit transfer. In the particular loom chosen for illustration, the drive end box 106 should reach transfer level about 20° ahead of front center and should remain in that position for about 40° of the cycle. The box 106 remains at its upper position because in the latter part of the next, or second, pick shuttle B will enter cell #2 of box 106. In the meantime the auxiliary lifting mechanism of Fig. 6 has completed its cycle of operation and the pawl 284 will be raised to inoperative position. The normal box lifting mechanism will thereafter control box 106 until another transfer cycle is initiated.

Shuttle B may be replenished automatically in a transfer cycle which is initiated in the sixth pick and completed during the early part of the eighth pick. From an inspection of Fig. 27, it will be apparent that shuttle B arrives in cell #1 of box 106 in the latter part of the sixth pick and shuttle A which is in cell #2 will be picked out of that cell in the seventh pick. Box 106 must thus be raised to transfer level in preparation for the seventh pick whether or not a transfer cycle is to occur. Bar No. 7 of chain 136 (Fig. 28) comes to active position while the sixth pick is still in progress. A sinker 174 is positioned on bar No. 7 to disable the revoker mechanism whereby detection of an exhausted bobbin in shuttle B might initiate a transfer cycle. Detection of shuttle B occurs in the latter part of the sixth pick after it arrives in cell #1 of box 106. Such detection is effected by a feeler finger 400 (see Fig. 21). Here again the false detection resulting from cell #1 of head end box 100 being empty is of no consequence. At the end of the sixth pick, when the lay reaches front center, the normal box lifting mechanism will have raised box 106 about half-way towards transfer level and the lift will be completed in the early part of the seventh pick so that shuttle A may be picked from cell #2. Since the eighth pick requires cell #1 at race plate level, the normal box lifting motion will start to lower box 106 during the latter part of the seventh pick. However, when a transfer cycle is initiated in the sixth pick the auxiliary box lifting mechanism (Fig. 6) of the present invention is put into operation and will counteract the efforts of the normal box motion to lower box 106 in the seventh pick. Thus box 106 will continue to press against the upper stops as the lay moves toward front center in the seventh pick and will engage the steadier 376 to be held in transfer position while the loom progresses through about 40° of its cycle in the course of which the lay reaches front center and starts back for the beginning of the eighth pick. During this 40° interval transfer is effected, the exhausted bobbin being ejected from shuttle B and through the empty cell #2 from which shuttle A was picked during the seventh pick. Inasmuch as cell #1 must now return to race plate level in order that shuttle B may be picked therefrom in the eighth pick, and the lowering of the normal box lifting mechanism of the loom is already well advanced, the box 106 will drop rapidly as soon as it leaves the steadier 376, thus catching up with the normal box motion mechanism and arriving at proper level before the picking motion at the drive end is actuated to propel shuttle B from cell #1 in the eighth pick.

A review of Figs. 27 and 28 will reveal several situations in which the revoker mechanism is essential. For example in the latter part of the third pick cells #1 of both boxes 100 and 106 are empty and a false indication could occur. In the fourth pick shuttle B is in cell #1 of the head end box 100 and if it were exhausted an indication could occur because cell #1 of box 106 is empty. Obviously transfer cannot be effected for shuttle B in the next pick. Therefore it is essential that the revoker mechanism be active to prevent initiation of transfer in any such situation. To this end risers 176 are positioned upon appropriate bars of chain 136.

Selection of the proper color for replenishment of the shuttles A and B in Fig. 27 is effected by the color selector mechanism described hereinabove. Sinkers 160 are positioned upon the chain 136 (see Fig. 28) to cause selection of the proper color for shuttle A. Risers 162 are positioned upon appropriate bars to cause selection of the proper color for shuttle B. It is of no consequence whether a riser or sinker be positioned upon bars No. 3 through No. 6 although for convenience, sinkers would ordinarily be used. The risers and sinkers operate the color selector linkage 148 (see Fig. 1) which in turn affects the mechanism shown in Fig. 18. When a riser operates the linkage 148 it will be pulled toward the left as viewed in Fig. 18, to shift the shaft 444 towards the left. As explained in said Alix et al. Patent 2,399,457, such operation will cause the selection of a bobbin from either of the cells controlled by slides operated by the left hand levers 534. Therefore such cells will be supplied with color appropriate for shuttle B. When a sinker 160 affects the linkage 148, the shaft 444 will be shifted into the position illustrated in Fig. 18 wherein the right hand levers 534 will be effective to select bobbins from the other two cells of the magazine 110. The latter cells are supplied with filled bobbins appropriate for replenishing shuttle A.

The sixteen pick cycle illustrated in Figs. 29 and 30 contemplates the use of four shuttles for two colors, each from two different sources. The shuttles A and A' carry one color and the shuttles B and B' carry the other. The colors are woven in alternating pick and pick relation and the sources are mixed, although not alternated. Thus the sequence may be: A, B, A, B, A', B', A', B', in the particular example chosen. In the course of a sixteen pick cycle, provision may be made for automatic replenishment for all four shuttles and the filling feeder attachment illustrated in Fig. 18 is so set up and adjusted that yarns of one color from two different sources are alternately supplied to the shuttles requiring such color. It is not contemplated that a particular source be associated with a particular shuttle although, as will be apparent from subsequent examples, such association may be arranged if so desired. Detection of shuttle A occurs in cell #1 of box 100 at the head end of the loom before the first pick and transfer occurs in the latter part of the first and the beginning of the second pick just as described in connection with shuttle A in Figs. 27 and 28. To this end the pattern chain 136 diagrammatically illustrated in Fig. 30 is provided with a sinker 174 on the first bar which disables the revoker mechanism to permit transfer if such is necessary. Similarly, the shuttle A' is detected in cell #4 of box 100 at the head end just before the fifth pick and transfer, if indicated, occurs in the latter part of the fifth and beginning of the sixth pick. In both cases the auxiliary lifting mechanism (Fig. 6) rapidly raises box 106 to transfer position.

Sinkers 160 and risers 162 control the color selector linkage 148 and move the mechanism shown in Fig. 18 into one of two positions longitudinally of the shaft 444 to bring one or the other of the feeder mechanisms 533 into play. Yarn of one color from two different sources may be separately placed in two cells of the magazine 110 and yarn of the other color from two different sources may be separately placed in the remaining cells. One selector mechanism 533 alternately drops yarn of one color from two cells and the other alternately drops yarn of the other color from the other two cells. Thus for replenishing the shuttles A or A' one of the selector mechanisms 533 is called upon to drop a filled bobbin from one of the cells containing yarn of the appropriate color. The bobbin thus released is projected into the shuttle A or A' in the ensuing transfer operation, all as described above.

The shuttles B and B' illustrated in Fig. 29 are detected in cell #1 of box 106 at the drive end of the loom and are replenished in the same manner as the shuttle B described in connection with Figs. 27 and 28. The color selector is operated by risers 162 to place the appropriate selector mechanism 533 (Fig. 18) into operation whereby to supply a filled bobbin of appropriate color from one of two sources for transfer to the shuttles B or B'. In both cases the auxiliary lifting mechanism (Fig. 6) counteracts the lowering of the normal box motion and maintains box 106 at transfer level through the latter part of the eleventh or fifteenth pick so that transfer may occur.

In Figs. 31 and 32 three shuttles are used for three different colors. Two of the colors are woven in alternating pick and pick relation for several picks after which a third color may be alternated in pick and pick relation with one of the first colors. For purposes of illustration a series of repeats of an eight pick cycle like that illustrated in Figs. 27 and 28 may be woven and followed by as few as two alternated insertions of a third color. For example, there may be six repeats making forty-eight picks. In that event the third color is inserted in the fiftieth pick and fifty-second pick, being alternated with one of the other colors in the forty-ninth pick. The repeat pattern may then be resumed. Transfer of the first two colors, A and B, is effected in the same manner as described above in connection with Figs. 27 and 28. The third color is carried by shuttle C in Fig. 31 and it will be observed that it moves from cell #3 of the head end box 100 in the fiftieth pick and enters cell #1 of box 106 while shuttle A occupies cell #2 thereof. In the next pick shuttle A leaves the drive end box 106 and transfer of shuttle C may thus occur between the time that shuttle A leaves box 106 and the point in the next pick cycle in which shuttle C must leave box 106. Thus a sinker 174 is positioned on bar No. 51 to disable the revoker and to permit transfer when indicated. Shuttle C is detected at the drive end side after it enters in cell #1 of box 106 and transfer thereof ensues exactly as it does in connection with the shuttle B in Fig. 27. Since three colors are involved the filling feeder mechanism of Fig. 18 is adjusted to supply filling from any one of three cells of the magazine 110 upon the positioning of the color selector mechanism in response to the presence of a sinker or graduated risers of two different sizes upon the appropriate bar of the pattern chain 136. Thus in Fig. 32 sinkers 160 are provided for the selection of the color for shuttle A and risers 162b of a particular diameter are provided for selection of the color for shuttle B. Risers 162c of larger diameter are provided for selection of the color for the shuttle C. The three different positions of the color selector linkage 148 (Fig. 1) thus provided, establish three different longitudinal positions for the shaft 444.

The operation diagrammatically illustrated in Figs. 33, 34 and 35 is illustrative of another type of weaving which heretofore could not be accomplished with automatic weft replenishment and full production upon the Crompton & Knowles W-3 loom with standard conversion units. The pattern chosen for illustration herein involves the insertion of five picks of one color followed by five picks of a second color. These five pick cycles alternate and each color is supplied from two different sources. As shown in said Figs. 33-35, a forty pick cycle may be set up which will provide for transfer of all four of the shuttles.

In such a forty pick cycle the shuttle A is detected after it enters cell #1 of the drive end box 106 in the first pick and transfer, if indicated, will occur during the second pick and early part of the third pick, the auxiliary lifting mechanism of Fig. 6 serving to hold the box 106 at transfer level long enough for it to engage the steadier 376 near the end of the second pick. Shuttle B is detected and transferred if necessary after it enters cell #1 of the drive end box 106 in the seventh pick. Shuttle A' is detected and transferred if necessary after it enters cell #1 of drive end box 106 in the twenty-third pick and shuttle B' (see Fig. 34) is detected and transferred if necessary after it enters cell #1 of the drive end box 106 in the twenty-seventh pick. Sinkers 174 are thus positioned upon the bars of chain 136, shown in Fig. 35, which control respectively the second, eighth, twenty-fourth and twenty-eighth picks, such sinkers disabling the revoker mechanism to permit transfer if required. It should be noted that in this particular example detection occurs only at the drive end of the loom. If the loom is equipped with the head end detector illustrated herein, it need not be altered or removed for operations such as the present example. As explained above, the two detector mechanisms are constructed so as not to interfere with one another. A consideration of the shuttle diagram in Figs. 33 and 34 will reveal that in each instance where the revoker will permit initiation of transfer the cell of head end box 100 which is associated with whichever of the head end detector feelers 448 or 462 (see Fig. 24) happens to be active, is empty. This factor must be kept in mind in building a chain for use in the present invention inasmuch as a filled bobbin in one cell would cancel the indication of an exhausted bobbin in the other if the indicator mechanism were activated in any pick wherein a shuttle occupies both of the cells into which active feelers are inserted. Color selection is controlled by risers 162 and sinkers 160 on the chain 136 (Fig. 35), the risers 162 serving to supply the color appropriate for shuttles A and A' alternately from two different sources within magazine 110 and the sinkers 160 serving to select the color appropriate for shuttles B and B' alternately from two other sources in magazine 110. In this particular instance there is no provision for associating a particular source with a particular shuttle but such provision could be made if so desired by the use of graduated risers as described above in connection with Figs. 31 and 32.

I claim:

1. In an automatic weft-replenishing loom having a shiftable multi-cell shuttle box at each end of the loom, a head motion including box shifting mechanism for moving said shuttle boxes in a predetermined sequence incident to weaving, and transfer means for projecting a weft-carrier into one of said shuttle boxes to replace an exhausted weft-carrier; the combination of normally-inactive auxiliary box shifting means adapted to move said one shuttle box into a transfer position and to maintain it in said transfer position until transfer is complete independently of movement imparted thereto by said head motion, said auxiliary box shifting means including a cam, a follower constantly engaged with said cam, means for rotating said cam for moving said follower through a complete predetermined path in each beat of the loom, a lever, means for selectively connecting said lever with said follower for movement therewith, and means for transmitting motion of said lever to said one shuttle box; and means responsive to initiation of operation of said transfer means for moving said connecting means into operative position.

2. In an automatic weft-replenishing loom operating with two or more shuttles in any sequence including sequencies in which each shuttle is active for but one pick at a time and having a shiftable shuttle box at each end of the loom, a magazine for reserve weft-carriers associated with the shuttle box at one end of the loom, a head motion including at least one pattern chain, means under control of a pattern chain for shifting said shuttle boxes in a predetermined sequence incident to weaving, detector mechanism operative upon weft-carriers in at least one of said shuttle boxes, transfer mechanism, means responsive to said detector mechanism adapted to initiate a cycle of operation of said transfer mechanism in which a reserve weft-carrier from said magazine is projected into one of said shuttle boxes to replace an exhausted weft-carrier detected by said detector mechanism, and means under control of a pattern chain for preventing initiation of a transfer cycle in any selected beat of the loom, the combination of normally-inactive auxiliary shifting means for the shuttle box associated with said magazine, and means operative as an incident to initiation of a transfer cycle for activating said auxiliary shifting means.

3. In an automatic weft-replenishing loom operating with two or more shuttles in any sequence including sequencies in which each shuttle is active for but one pick at a time and having a shiftable shuttle box at each end of the loom, a magazine for reserve weft-carriers associated with the shuttle box at one end of the loom, a head motion including at least one pattern chain, means under control of a pattern chain for shifting said shuttle boxes in a predetermined sequence incident to weaving, detector mechanism operative upon weft-carriers in at least one of said shuttle boxes, transfer mechanism, means responsive to said detector mechanism adapted to initiate a cycle of operation of said transfer mechanism in which a reserve weft-carrier from said magazine is projected into one of said shuttle boxes to replace an exhausted weft-carrier detected by said detector mechanism, and means under control of a pattern chain for preventing initiation of a transfer cycle in any selected beat of the loom, the combination of normally-inactive auxiliary shifting means for the shuttle box associated with said magazine, means operative as an incident to initiation of a transfer cycle for activating said auxiliary shifting means, and said auxiliary shifting means including means movable in timed relation with said transfer mechanism and adapted to move said associated shuttle box into operative position relative to said magazine in time to receive a weft-carrier therefrom and to hold said shuttle box in said position until the transfer cycle is complete.

4. In an automatic weft-replenishing loom having a horizontally disposed race plate and operating with two or more shuttles in any sequence including sequences in which each shuttle is active for but one pick at a time, a multi-cell shuttle box at the head end and a shuttle box having two vertically stacked cells at the drive end of the loom said shuttle boxes being shiftable vertically relative to said race plate, a magazine for reserve weft-carriers associated with the shuttle box at the drive end of the loom and which is in transfer position relative to said drive-end shuttle box when the lower cell of said shuttle box is at race plate level, a head motion including at least one pattern chain, means under control of a pattern chain for shifting said shuttle boxes in a predetermined sequence incident to weaving, detector mechanism operative upon a weft-carrier in the upper cell of the shuttle box at the drive end of the loom, transfer mechanism, means adapted upon the detection of an exhausted weft-carrier in said upper cell of said drive-end shuttle box to initiate a cycle of operation of said transfer mechanism in which a reserve weft-carrier from said magazine is projected into the shuttle in the upper cell of said drive-end shuttle box and the exhausted weft-carrier is discharged through the lower cell thereof, means under control of a pattern chain for preventing initiation of a transfer cycle upon such detection in any pick except one which is immediately followed by a pick in which a shuttle is propelled from the lower cell of said drive-end shuttle box whereby transfer may occur only when said lower cell is empty at the time within the transfer cycle in which the exhausted weft-carrier from the shuttle in said upper cell must be discharged through said lower cell, normally inactive auxiliary shifting means for said drive-end shuttle box, means operative as an incident to initiation of a transfer cycle for activating said auxiliary shifting means, and said auxiliary shifting means including means movable in timed relation with said transfer mechanism to hold said shuttle box in transfer position relative to said magazine until the transfer cycle is complete.

5. In an automatic weft-replenishing loom having a horizontally disposed race plate and operating with two or more shuttles in any sequence including sequences in which each shuttle is active for one pick at a time, a shuttle box having a plurality of vertically stacked cells at the head end of the loom and a shuttle box having two vertically stacked cells at the drive end of the loom said shuttle boxes being shiftable vertically relative to said race plate, a magazine for reserve weft-carriers associated with the shuttle box at the drive end of the loom and which is in transfer position relative to said drive-end shuttle box when the lower cell of said shuttle box is at race plate level, a head motion including at least one pattern chain, means under control of a pattern chain for shifting said shuttle boxes in a predetermined sequence incident to weaving, detector mechanism operative upon a weft-carrier in at least one cell of said head-end shuttle box, transfer mechanism, means adapted upon detection of an exhausted weft-carrier by said detector mechanism to initiate a transfer cycle near the end of one pick which will continue through the next pick and will be completed in the early part of the next succeeding pick, and means under the control of a pattern chain for preventing initiation of a transfer cycle upon such detection except when in the next pick both cells of the drive-end box will be empty and the weft-carrier thus detected will be propelled across the loom to enter the upper cell of the drive-end shuttle box.

6. In an automatic weft-replenishing loom having a horizontally disposed race plate and operating with two or more shuttles in any sequence including sequences in which each shuttle is active for one pick at a time, a shuttle box having a plurality of vertically stacked cells at the head end of the loom and a shuttle box having two vertically stacked cells at the drive end of the loom said shuttle boxes being shiftable vertically relative to said race plate, a magazine for reserve weft-carriers associated with the shuttle box at the drive end of the loom and which is in transfer position relative to said drive-end shuttle box when the lower cell of said shuttle box is at race plate level, a head motion including at least one pattern chain, means under control of a pattern chain for shifting said shuttle boxes in a predetermined sequence incident to weaving, detector mechanism operative upon a weft-carrier in at least one cell of said head-end shuttle box, transfer mechanism, means adapted upon detection of an exhausted weft-carrier by said detector mechanism to initiate a transfer cycle near the end of one pick which will continue through the next pick and will be completed in the early part of the next succeeding pick, means under the control of a pattern chain for preventing initiation of a transfer cycle upon such detection except when in the next pick both cells of the drive-end box will be empty and the weft-carrier thus detected will be propelled across the loom to enter the upper cell of the drive-end shuttle box, normally inactive auxiliary shifting means for said drive-end shuttle box, means operative as an incident to initiation of a transfer cycle for activating said auxiliary shifting means, and said auxiliary shifting means including means movable in timed relation with said transfer mechanism to move said drive-end shuttle box from the position in which said exhausted weft-carrier is received in said upper cell during said next pick to transfer position relative to said magazine in time for transfer to be effected before a shuttle moves in the next succeeding pick.

7. In an automatic weft-replenishing loom operating with two or more shuttles, a shiftable shuttle box at each end of the loom; a head motion including at least one pattern chain; transfer mechanism for projecting a reserve weft-carrier into a shuttle resting in one of said shuttle boxes; means for initiating a cycle of operation of said transfer mechanism including at least one sensing device associated with each of said shuttle boxes and operative upon a weft-carrier in a shuttle resting in said shuttle boxes, said initiating means also including a member movable into one position to initiate and into another position to prevent initiation of a transfer cycle, connecting means between each of said sensing devices and said member whereby movement of either of said sensing devices is effective to move said member into said another position; means under the control of a pattern chain for moving said member into said another position in any selected beat of the loom; and spring means constantly urging said member to move into said one position whereby a transfer cycle will be initiated in any beat of the loom in which no movement is imparted to said member by said sensing devices or by said pattern-chain-controlled means.

8. In an automatic weft-replenishing loom operating with two or more shuttles, a shiftable shuttle box at each end of the loom; a head motion including at least one pattern chain; transfer mechanism for projecting a reserve weft-carrier into a shuttle resting in one of said shuttle boxes; means for initiating a cycle of operation of said transfer mechanism including at least one sensing device associated with each of said shuttle boxes and operative upon a weft-carrier in a shuttle resting in said shuttle boxes, said initiating means also including a rock-shaft movable in one direction to initiate and in the other direction to prevent initiation of a transfer cycle, a one-way connecting device between each of said sensing devices and said rock-shaft whereby movement of either of said sensing devices is effective to rock said rock shaft only in said other direction; means under the control of a pattern chain for rocking said rock-shaft in any selected beat of the loom; a one-way connecting device between said last-named means and said rock-shaft whereby said last-named means may rock said rock-shaft in said other direction; and spring means constantly urging said rock-shaft to rock in said one direction whereby a transfer cycle may be initiated only in a beat of the loom in which no movement is imparted to said rock-shaft by said sensing devices or by said pattern-chain-controlled means.

9. In an automatic weft-replenishing loom operating with two or more shuttles in any sequence including sequences in which each shuttle is active for one pick at a time, a breast-beam, a lay having a race-plate, means for moving said lay toward and from said breast-beam on each beat of the loom, a shiftable shuttle box having at least four vertically stacked cells at one end of the loom, a shiftable shuttle box at the other end of the loom, a magazine for reserve weft-carriers associated with one of said shuttle boxes, transfer means for projecting a reserve weft-carrier from said magazine into a cell of one of said shuttle boxes, a head motion including at least one pattern chain, means under control of a pattern chain for shifting said shuttle boxes in a predetermined sequence incident to weaving to bring any selected cell of either of said shuttle boxes to race-plate-level, detector mechanism, means responsive to said detector mechanism and adapted to initiate a cycle of operation of said transfer means, said detector mechanism including a support fixed with respect to said breast beam, vertically movable sensing means carried by said support, means for moving said sensing means vertically with said first-named shuttle box, said sensing means including a first feeler maintained constantly in a position to engage a weft-carrier in one cell of said first-named shuttle box on each beat of the loom and a second feeler maintained constantly in a position to engage a weft-carrier in another cell of said first-named shuttle box, means on said support movable between two positions, means responsive to the position of said movable means for initiating a transfer cycle, means connected with said first feeler for transmitting motion of said first feeler to said movable means only when one cell is substantially at race-plate level, and means connected with said second feeler for transmitting motion of said second feeler to said movable means only when said another cell is substantially at race plate level.

References Cited in the file of this patent

UNITED STATES PATENTS

| | | |
|---|---|---|
| 1,817,138 | Gordon | Aug. 4, 1931 |
| 2,065,771 | Turner | Dec. 29, 1936 |
| 2,333,904 | Turner | Nov. 9, 1943 |
| 2,669,260 | Foisy et al. | Feb. 16, 1954 |